United States Patent [19]
Geaghan et al.

[11] Patent Number: 5,790,114
[45] Date of Patent: Aug. 4, 1998

[54] ELECTRONIC WHITEBOARD WITH MULTI-FUNCTIONAL USER INTERFACE

[75] Inventors: Bernard O. Geaghan, Salem, N.H.; Stephen P. Atwood, Worcester; James Sprague, Framingham, both of Mass.

[73] Assignee: Microtouch Systems, Inc., Methuen, Mass.

[21] Appl. No.: 725,458

[22] Filed: Oct. 4, 1996

[51] Int. Cl.⁶ ................................................ G06F 3/033
[52] U.S. Cl. .................... 345/326; 345/179; 345/174; 178/18; 178/19
[58] Field of Search ............................ 345/173, 177, 345/179, 180, 340, 341, 342, 348, 156, 174, 326; 178/18, 19

[56] References Cited

U.S. PATENT DOCUMENTS

| | | | |
|---|---|---|---|
| 4,501,931 | 2/1985 | Ohya et al. | 345/179 |
| 4,633,436 | 12/1986 | Flurry | 345/179 |
| 5,063,600 | 11/1991 | Norwood | 340/312 X |
| 5,179,655 | 1/1993 | Noguchi et al. | 395/158 |
| 5,274,362 | 12/1993 | Potuin | 345/178 |
| 5,325,110 | 6/1994 | Tang et al. | 345/157 |
| 5,343,220 | 8/1994 | Veasy et al. | 345/199 |
| 5,420,607 | 5/1995 | Miller et al. | 345/256 |
| 5,565,657 | 10/1996 | Merz | 345/173 X |

Primary Examiner—Raymond J. Bayerl
Assistant Examiner—Chadwick A. Jackson
Attorney, Agent, or Firm—Banner & Witcoff Ltd.

[57] ABSTRACT

An electronic whiteboard is coupled to a computer which receives information from the whiteboard indicative of graphical user inputs entered via a writing region of the whiteboard and control inputs entered via a control region of the whiteboard. A driver executing on the computer receives the information transmitted by the whiteboard, performs certain actions on the received information and causes an application program to retrieve the information and store the information to a session file. The application provides a user interface which allows a user to view images generated on the whiteboard, store such images, view previously stored images and to manipulate the images in a variety of ways.

15 Claims, 7 Drawing Sheets

ELECTRONIC WHITEBOARD WITH MULTI-FUNCTIONAL USER INTERFACE

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

1. Field of the Invention

This invention relates generally to the field of user friendly electronic input devices for use with general purpose computers.

2. Background

Whiteboards are a well known medium to facilitate personal thoughts and group discussions by providing a convenient surface upon which notes, drawings, charts, or other notations may be made. As with the traditional chalkboard, whiteboards allow notations to be made in multiple colors and to then be erased. Whiteboards offer several advantages over chalkboards including a clean white surface which provides for greater contrast over the traditional green background of chalkboards. In addition, writing on a whiteboard is easier for many than on the traditional chalkboard. For example, the smooth writing surface of the whiteboard allows easy use of the erasable felt tip markers used on whiteboards, whereas the chalkboard surface provides a somewhat scratchy surface to hold the chalk used for writing on such surfaces. In addition, many users prefer a whiteboard to a chalkboard simply because the marker may be gripped easier than chalk and does not mark the user's hand when gripped.

Recently, whiteboards have been developed to allow the user writings and notations entered upon the whiteboard to be transmitted to a digital computer for storage, display and manipulation. Such devices allow the images and notations made upon the whiteboard to be saved in the computer, to be displayed, to be printed, transmitted or manipulated. While such devices increase the versatility and useability of the traditional whiteboard, a need continues to exist for a whiteboard which improves upon the mechanisms to enter images and notations into a computer via the whiteboard, and which allows for subsequent operations to be performed on the stored data received from the whiteboard.

SUMMARY OF THE INVENTION

It is a principle object of the present invention to provide a whiteboard which enhances the ability to create, retain and review information. In a principle aspect of the present invention, a whiteboard is coupled to a general purpose digital computer (personal computer or PC) to allow any writings, drawings or other notations (collectively "graphical user inputs") made on the whiteboard to be displayed on a monitor coupled to the computer. The graphical user inputs are also stored in the computer for subsequent, retrieval, manipulation, and printing. Previously stored material may be subsequently reviewed at the user's convenience. Erasure of the inputs are also captured and stored.

Advantageously, whiteboard systems operating in accordance with the present invention allow a user to work with the whiteboard in two ways. First, graphical user inputs may be stored into a file for subsequent retrieval. Second, previously stored session files may be retrieved to view, print and/or copy pages to other applications and to store, manipulate, display and print the information. The foregoing functions are preferably provided by whiteboard application software operating on the PC.

The whiteboard application software implements a recorder function which operates to allow graphical user inputs and certain commands entered via the whiteboard to be stored to a whiteboard session file, which is a recording of all activity on the whiteboard since the file was created. The user may organize the recording of whiteboard activity by grouping certain activities in the same or different files or alternatively, by storing all activities in a single file.

A snapshot may be created either by the user or automatically by the application software to allow creation of an image which is the composite of all graphical user inputs from a first marker inserted in the session file to a second, subsequent, marker inserted in the session file. The application software implements a viewer function to display all of the snapshots in a session file and to allow selection, viewing and manipulation of a particular snapshot. For instance, a snapshot may be selected, viewed and moved or copied from one session file to another. In addition, a snapshot may be selected and exported in a selected data file format for manipulation by another application program. Advantageously, the sequence in which graphical user inputs are entered, together with time information indicative of the temporal relationship in which the inputs are entered, are stored in order to allow subsequent viewing of the manner in which the inputs were entered and also to allow editing of individual writing or erasure strokes. As used herein, the term "stroke" is defined to mean the data points generated from the time a marker or other instrument such as a human finger or an eraser is pressed upon the writing surface of the whiteboard with sufficient pressure to cause transmission of data from the whiteboard to the PC to the time the aforesaid pressure applied to the writing surface is terminated by lifting off of the marker, finger, or eraser or by contacting any edge of the whiteboard. In addition, nothing the user can do at the whiteboard will cause data to be removed from the session file. Of course files can be deleted in the normal manner from the PC.

The application software preferably receives information transmitted from the whiteboard by way of a driver which receives an information bit-stream, formatted as packets, from the whiteboard and performs a number of functions on the received bits before storing the information to a buffer for retrieval by the application software. For example, the driver performs certain error checking functions on the received bit-stream and discards packets determined to be corrupted. The application software advantageously inserts a pen-up command, which indicates that the marker, or eraser, used by the user has been lifted off of the whiteboard writing surface, to avoid a phenomena known as streaking, where the corrupted packet, discarded by the driver, may have contained a pen-up command.

These and other features and advantages of the invention will be better understood by considering the following detailed description.

DETAILED DESCRIPTION

I. Overview

Figure 1:
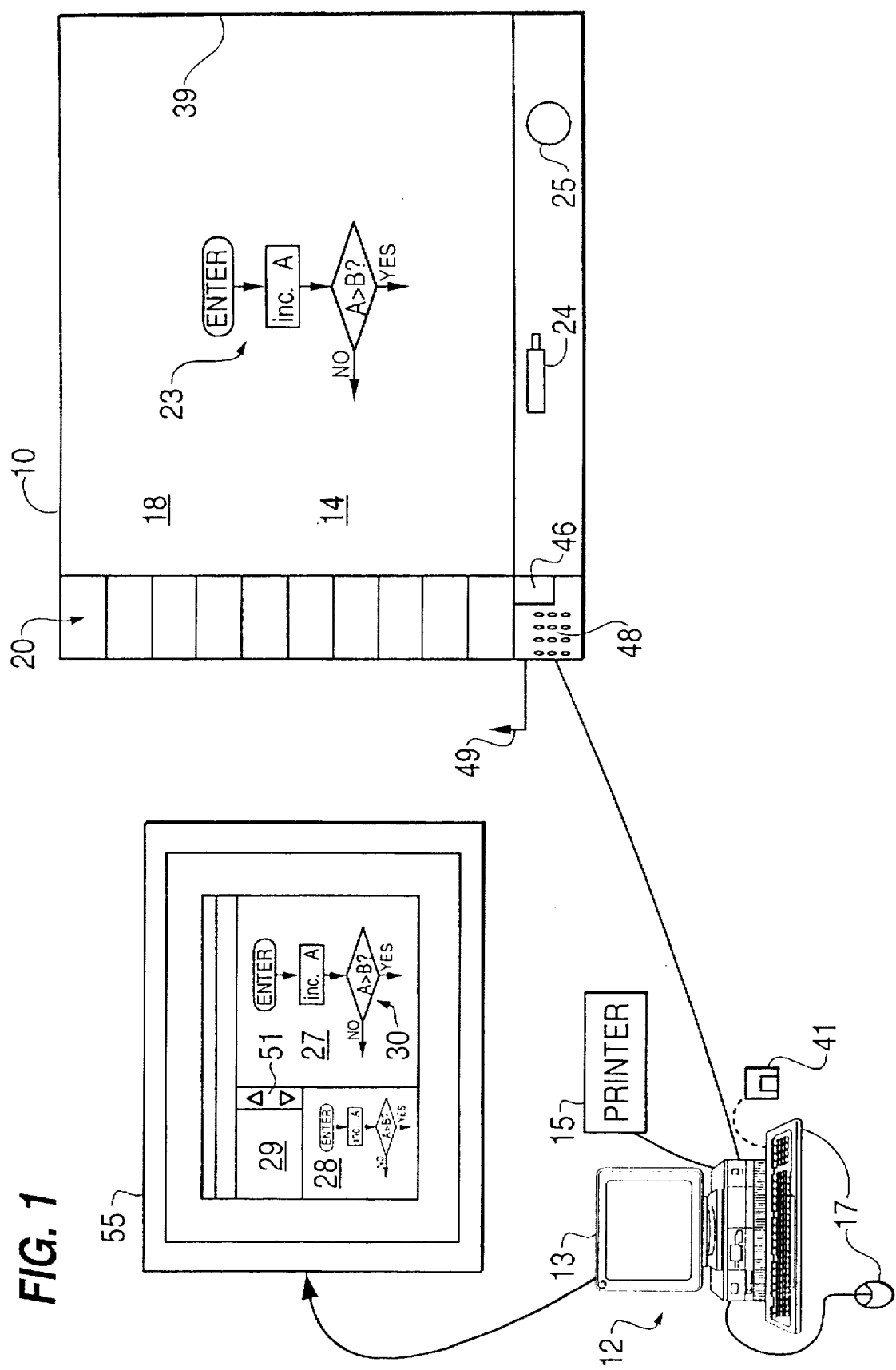
FIG. 1 is a schematic block diagram of a preferred embodiment.

FIG. 1 of the drawings shows a preferred embodiment which includes a whiteboard 10 coupled to a general purpose desktop computer 12. The desktop computer preferably takes the form of a personal computer (PC) which operates the Windows95™ or the Windows 3.1™ operating system, both of which are available from the Microsoft Corporation, Redmond, Wash. The whiteboard 10 preferably employs conventional resistive membrane technology responsive to pressure applied upon whiteboard writing surface 14. In response to an input applied by pressing upon the whiteboard writing surface 14, two voltages, indicative of an x and y coordinate of the input are generated for use by a controller (shown in FIG. 2) which converts the two analog voltages into digital coordinates for transmission to the PC 12 which includes a display 13 and is coupled to a printer 15. The PC is also coupled to a printing device and other input devices such as a mouse 17 and keyboard 19 to receive inputs for controlling and initiating different functions on the PC. The controller preferably recognizes user inputs applied in a writing region 18 of the whiteboard as graphical input data, and user inputs applied in a button region 20 of the whiteboard as command inputs corresponding to one of a plurality of commands, for transmitting control information which is either stored by the PC or interpreted by the PC to execute a predefined function. FIG. 1 shows at 23 an image which may be created by way of marker 24 upon the writing region 18. When new images are desired to be created, eraser 25 may be used to erase the image 23 from the writing region 18. The eraser 25 is advantageously circular in shape to allow for a plurality of erasing functions as described in greater detail herein.

The whiteboard 10 also includes a speaker 48 for transmission of audible information to alert the user as to particular actions being performed on the whiteboard and for other status information. A visual indication in the form of a Light Emitting Diode (LED) 46 is also provided to indicate to the user that power to the whiteboard is being supplied through power cord 49 and that the whiteboard is operational.

The button or control region 20 preferably includes the following buttons which may be touched by the user with either a finger or by use of a marker 24 to cause transmission of a signal by the controller 16 which is indicative of the desired command to the PC: (a) four pen color buttons including red, green, blue and black, (b) a narrow erase button, (c) a wide erase button, (d) a snapshot/erase all button, (e) a snapshot button, (f) a print button, and (g) a show board button. A more detailed explanation of the functions performed by each of these buttons is provided below.

The PC 12 preferably has stored therein, the aforementioned whiteboard application software which implements a recorder function for recording user input data entered via the whiteboard surface 14, and a viewer function for displaying and allowing manipulation of the recorded data. An enlarged view of the display 13 is shown in FIG. 1 at 55. The application software, provides and accepts information via an easy to use Graphical User Interface (GUI).

As seen at 55, the display 55 displays the viewer within a window which preferably contains three regions: a selection region 27, a current board region 28 and a snapshot region 29. Selection region 27 displays, as shown at 30, an image which the user has selected for display. The image in region 27 may be either an image which has been previously entered and stored, or may be an image representative of inputs currently being entered onto the whiteboard. Current board region 28 displays an image representative of inputs currently being entered onto the whiteboard. Thus, if the user has selected the current image for display in the selection region then the selection region 27 and the current image region 28 will show the same image. Snapshot region 29 contains a reduced size version of each snapshot contained in the currently open session file. A scroll bar with buttons such as seen at 51 allows the user to scroll up or down through the images to select an image. Once selected, the image is displayed in selection region 27.

Figure 2:
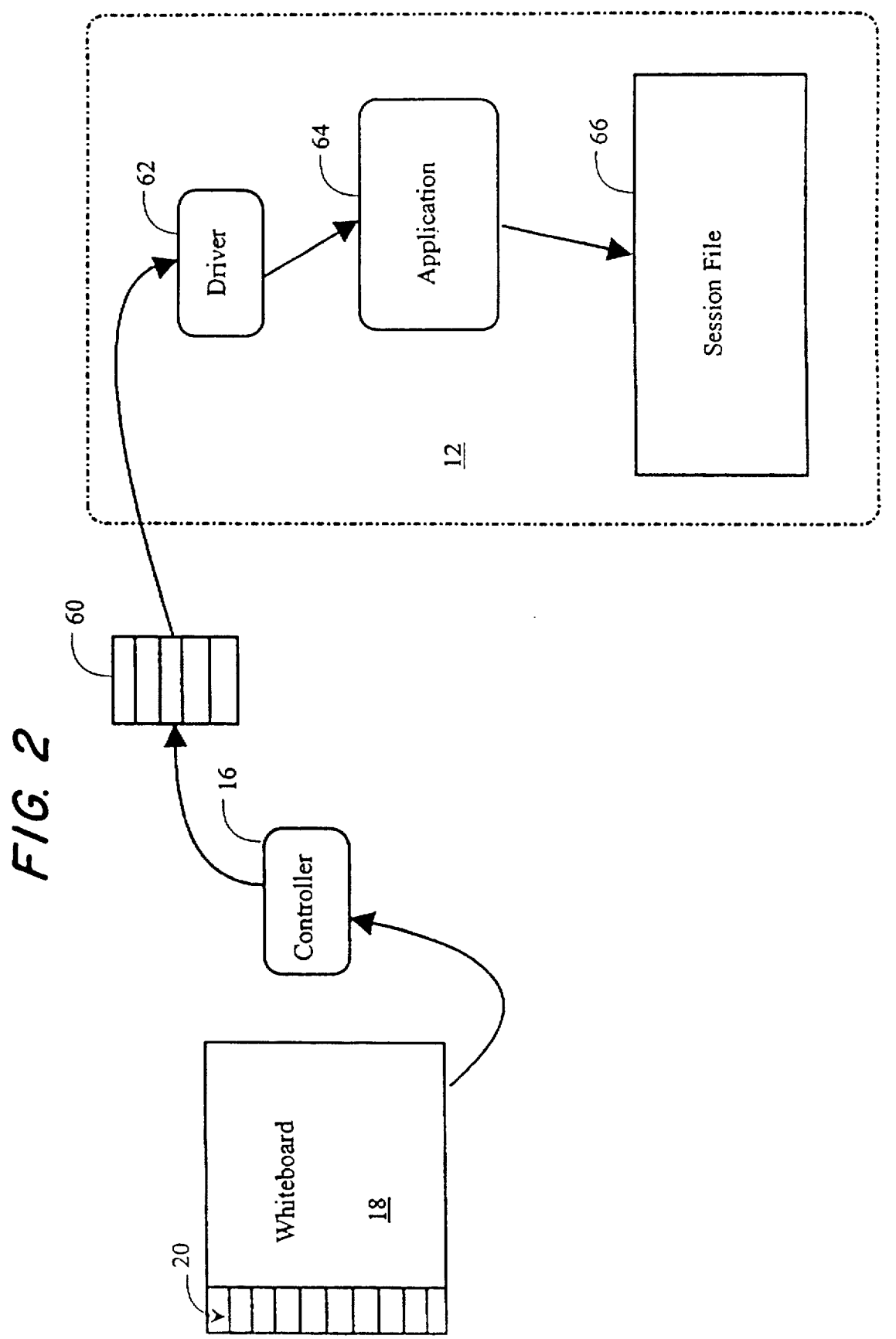
FIG. 2 is a schematic representation of the information flow in the system of FIG. 1.

FIG. 2 of the drawings shows the logical flow of information from the whiteboard 10 to the PC 12. Graphical user inputs generated via the writing region 18 and the control region 20 are transmitted to the controller which generates a stream of data packets, one of which is seen at 60, for transmission to the PC 12. A driver 62 executed by the PC receives the data packets 60, performs certain error checking and other functions on the data, and an application program 64 executed by the PC receives the data from the driver, eliminates redundant data and stores the data to a session file 66. The data packet is formatted in a manner explained in further detail below in connection with the Format Tablet command implemented by the controller. The session file is formatted in a manner more fully explained in connection with FIG. 5.

II. Whiteboard

The whiteboard 10 may take a variety of sizes depending on the location in which it is to be used. For instance, a preferred embodiment has dimensions of 24×36 inches to allow use in an office or cubicle by an individual user. Whiteboards of larger sizes may find use in conference rooms or meeting areas for use during group discussions. As noted above, the whiteboard preferably employs a sensor using resistive membrane technology to detect the position of user inputs on the writing surface 14. While any one of a number of technologies may be employed to detect the user inputs, resistive membrane technology has been found to have a number for advantages including durability, reliability, relatively low cost. In addition, resistive membrane technology allows manufacturing simplicity.

The writing surface 14 advantageously allows the use of conventional erasable felt-tip markers such as seen at 24. The writing region 18 of the whiteboard is white and thus provides a high degree of contrast with most colors of markers. The writing surface 14 may be erased and cleaned by an eraser 25 which facilitates the erasure of the whiteboard in a manner to be explained, or by most other conventional disposable towels, tissues etc.

The sensor is located under the writing surface of the whiteboard. It consists of two sheets of material that are physically separated by tension. Each sheet is coated with a conductive film and electrical contacts are made to the upper and lower edges of the bottom (Y) sheet and to the left and right edges of the top (X) sheet. These four contacts are connected via wires to the controller (shown in FIG. 2 and described in greater detail below). Writing on the surface is sensed by applying sufficient force to cause the two resistive coatings to come into contact with each other. The sheets act as resistance dividers and a voltage gradient is created by applying different voltages to the edges of one sheet. The voltage at the point of contact is induced onto the sheet that is not powered. This voltage is directly proportional to the location of contact on the powered sheet. If, for example, the contact point is ¼ of the way over from the left edge of the sensor and ½ the way up from the bottom edge, the voltages describing the exact location of contact could be expressed in coordinate form as follows:

$$\text{coordinate is } (¼ \times gradX, ½ \times gradY)$$

where, gradX=right edge drive voltage—left edge drive voltage gradY=top edge drive voltage—bottom edge drive voltage With the right and top drive voltages set to 5V, and the left and bottom voltages set to 0V, the coordinate reduces to (1.25, 2.5).

Whiteboard Function Keys

The whiteboard is designed with function keys, or buttons 20 around the outside perimeter to allow the user to transact most normal drawing activities directly from the board. The application supports decoding and processing of these function keys as needed and described herein:

red pen Change the current draw color to red black pen Change the current draw color to black green pen Change the current draw color to green blue pen Change the current draw color to blue narrow erase Erase a narrow region around the current draw position wide erase Erase a wide region around the current draw position snapshot/erase all Erase the whole board and insert a bookmark to save the current image as a snapshot print Print a copy of the current image snapshot Insert a bookmark to save the current image as a snapshot Show Board Restores the viewer window to foreground focus.

III. Controller

Figure 3:
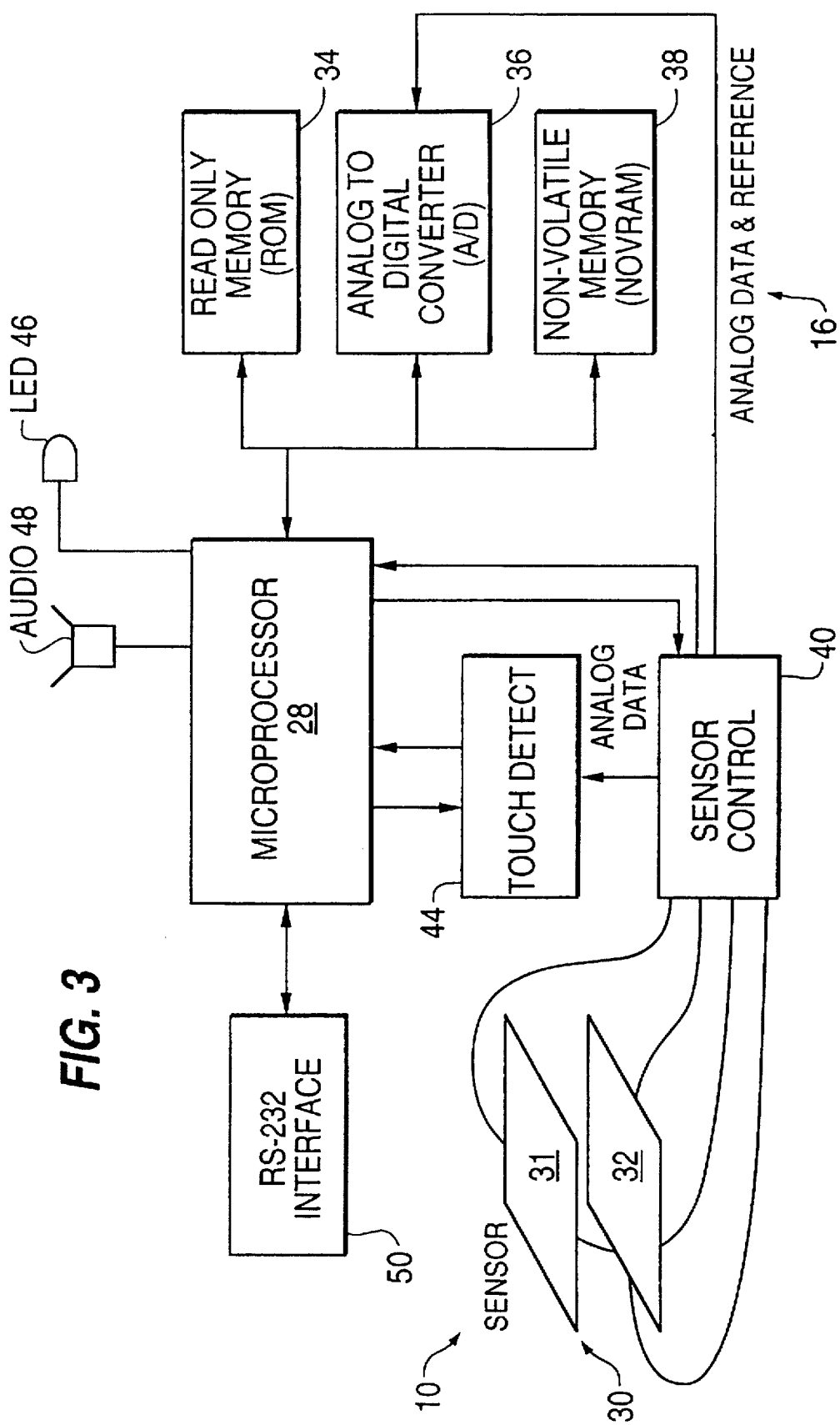
FIG. 3 is a block diagram of the major components of a controller contained in the whiteboard of FIG. 1.

FIG. 3 of the drawings shows a logical block diagram of the components in the controller 16. The controller employs a conventional microprocessor 28 to implement the functions performed by the controller by way of a program stored in ROM 34. An Analog-to-Digital (A/D) converter 36 converts analog signals received from whiteboard sensor 30 into digital information for processing by the microprocessor 28. A Non-Volatile Random Access Memory (NOVRAM) 38 stores configuration information. A sensor control module 40 responds to control signals from microprocessor 28 to provide appropriate analog signals to the sensor 30 and to receive electrical signals in the form of analog signals from the sensor 30. A touch detect circuit 44 informs microprocessor 28 each time a new touch is detected on the sensor 30, by checking for initial contact and verifying that contact is being maintained. The controller also includes a Light-Emitting Diode (LED) 46 and a speaker 48 for generation of visual and audible information. An RS-232 interface 50 provides a serial link between the controller and the PC. The microcontroller 28 is responsible for coordinating all activity of the controller. It takes sensor data from the A/D converter, calculates touch coordinates, filters coordinate data, sends the data to the outside world, and decodes messages from, and sends messages to, the outside world.

As previously noted, the controller receives two-dimensional positional information by way of four wires coupled to whiteboard resistive membrane sensor assembly 30. As seen, the sensor 30 includes a top sheet 31, and a bottom sheet 32. The exterior surface of the top sheet 31 corresponds to the writing surface 14. The wires coupled to the sheets 31 and 32 are alternately used to provide electrical energy to one sheet and to detect a user input with the opposing sheet by detecting the voltage at the location which is pressed by the user.

The controller implements a set of functions which are executed upon appropriate request by driver software executed by the PC 12. Each of the functions implemented by the controller is described individually below.

Audio Tone Request

The controller provides audible warnings via LED 46 to the user. This function is selected by a host command which takes the following format:

$$\text{<SOH>ATx<CR>}$$

where, SOH and CR are qualifiers. SOH (Start Of Header) is a qualifier which indicates that the following data is meant to be interpreted as a command. CR is a terminator for a command. When the controller receives CR it then knows that the command being received has been received. X is a variable which specifies a unique sound. The sounds preferably include a click, a beep, a fanfare sound, a flop and a hum. A click is a single tone of very short duration. A beep is a single tone of approximately 0.125 sec duration and of mid to high frequency. A fanfare sound is a series of three beeps, each incrementing in frequency from the previous. A flop is a series of three beeps, each decreasing in frequency from the previous. A hum is a low frequency tone which is continuous during touch. Any one of the foregoing sounds may be produced in response to events including touchdown, erase, button touch and button touch fault.

Calibrate Extended

Syntax: <SOH>CX<CR>

Description: Initiates an interactive, two-point calibration of the touchscreen, to allow for calibration of the size of the active area of the touchscreen. As used herein, the term "active area" refers to a rectangular area on the touchscreen which may be contacted by a touch device to cause transmission of positional digital values indicative of the position of the contact of the touch device. Contact of a touch device outside of the active area is ignored by the controller.

The calibration points (targets) are set inward from the corner of the video image provided by the touchscreen for accuracy and ease of operation. During calibration, the active area of the touch screen is defined by mapping locations to an absolute X, Y coordinate system. Two target areas on the screen are touched which sends the X, Y coordinates for those touch points to the controller. The controller calculates all other touch points based on these two values.

Finger Only

Syntax: <SOH>FO<CR>

Description: Causes the controller to accept only finger (i.e. marker or finger) input and is the default mode when using a resistive membrane whiteboard. If a whiteboard employing sensor technology which allows use of a special pen electrically coupled to the whiteboard sensor is use, then the controller may operate to accept inputs via different devices which may have different electrical interactions with the whiteboard sensor. As described in U.S. patent application Ser. No. 08/503,343 entitled "A Touchscreen Controller with Pen and/or Finger Inputs", such a feature advantageously allows the controller to determine what type of input device is being used. However, for a resistive membrane whiteboard, there is no direct electrical interaction between the sensor and the input device because the writing surface 18 electrically insulates the input device from the sensor. The following description is applicable however should the whiteboard take the form of a capacitive sensor such as described in the aforementioned '539 patent. With such devices, the controller can ignore pen input and can offer three touch device inputs:

(1) Pen or Finger mode detects pen and finger contact, giving priority to pen contact when both are detected.

(2) Finger Only mode detects finger contact only and processes finger coordinate data.

(3) Pen Only mode detects pen contact only and processes pen coordinate data.

This setting changes back to the default setting at power-up, or if a Restore Defaults command is issued. If the default setting in the controller data block 1 has been changed, this setting only changes back to the default setting with a Restore Defaults command.

Response: <SOH>0<CR> Positive response.

Format Raw

Syntax: <SOH>FR<CR>

Description: This command is used primarily for diagnostics. It causes the controller to return the signal level (amount of touch) of each of the four whiteboard corners in digital format. The returned values are not corrected for offset and stray values. However, the offset and stray values may be obtained using the Get Parameter Block command. The Format Raw data is a 7-byte packet that includes 1 status byte and 6 bytes of binary corner data. The data format for the packet is advantageously fixed in order to provide the most efficient transfer of data. The first byte of each packet always has its high bit (Bit 7) set to provide synchronization with the host system. Data is returned in 10-bits, which are delivered in two bytes.

To use Format Raw, the controller and host PC must be in an 8-bit data communication mode. A Reset command must be issued to terminate format Raw The controller may return several bytes of data between the time a Reset command is issued and when the controller receives the Reset command. A continuous scan can be performed for the Reset acknowledgment or a second Reset after approximately 10 seconds has passed may be issued.

Response: <SOH>0<CR> Positive response.

After the controller is in Format Raw mode, the controller continuously outputs data in the following format:

<7-byte-packet><7-byte-packet> . . . <7-byte-packet> . . .

TABLE 1

| Byte | Bits 0–7 | |
|---|---|---|
| 1 | b0–b3: | Drive level (amount of signal sent from controller) |
| | b4: | Reserved |
| | b5: | Reserved |
| | b6: | Reserved |
| | b7: | Synchronization bit (Always 1) |
| 2 | b0–b2: | 3 most significant bits of upper left (UL) corner |
| | b3: | Always 0 |
| | b4–b6: | 3 most significant bits of lower left (LL) corner |
| | b7: | Always 0 |

TABLE 1-continued

| Byte | Bits 0–7 | |
|---|---|---|
| 3 | b0–b2: | 3 most significant bits of lower right (LR) corner |
| | b3: | Always 0 |
| | b4–b6: | 3 most significant bits of upper right (UR) corner |
| | b7: | Always 0 |
| 4 | b0–b6: | 7 least significant bits of lower left (LL) corner |
| | b7: | Always 0 |
| 5 | b0–b6: | 7 least significant bits of upper left (UL) corner |
| | b7: | Always 0 |
| 6 | b0–b6: | 7 least significant bits of upper right (UR) corner |
| | b7: | Always 0 |
| 7 | b0–b6: | 7 least significant bits of lower right (LR) corner |
| | b7: | Always 0 |

Format Tablet

Syntax: <SOH>FT<CR>

Description: This is the default format and is the only format in which data is transmitted. This command causes the controller to output the X, Y touch coordinate data in a 5-byte packet. The packet includes 1 status byte and 4 bytes of binary X, Y coordinate data. The protocol also establishes the X and Y coordinate output as 14 binary bits providing a range of 0 to 16,383. The low order bits (X3–X0 and Y3–Y0) in a 1024 by 1024 touch screen are not significant because data can fluctuate with each touch, and therefore may not be completely accurate. To use Format Tablet, the controller and host system must be in an 8-bit data communication mode.

Response: <SOH>)<CR> Positive response.

After the controller is in Format Tablet mode, touching the screen causes the controller to return a response in the following format:

SxxYy

S=Status byte; first byte of data. Refer to Table 2 below which defines the status bits (Byte 1) for the Format Tablet data.

Xx=X(horizontal) coordinate data; second and third bytes of data.

Yy=Y(vertical) coordinate data; fourth and fifth bytes of data.

| Data | MSB* | | Bits | | | | LSB* | |
|---|---|---|---|---|---|---|---|---|
| Sequence | 7 | 6 | 5 | 4 | 3 | 2 | 1 | 0 |
| S-Byte 1 | 1 | S6 | S5 | S4 | S3 | S2 | S1 | S0 |
| X-Byte 2 | 0 | X6 | X5 | X4 | X3 | X2 | X1 | X0 |
| x-Byte 3 | 0 | X13 | X12 | X11 | X10 | X9 | X8 | X7 |
| Y-Byte 4 | 0 | Y6 | Y5 | Y4 | Y3 | Y2 | Y1 | Y0 |
| Y-Byte 5 | 0 | Y13 | Y12 | Y11 | Y10 | Y9 | Y8 | Y7 |

TABLE 2

Format Tablet Status Bits

| Bit | Description | Values |
|---|---|---|
| S0 | Switch 1 status | Not used |
| S1 | Switch 2 status | 0 = Switch is off. |
| S2–S4 | Reserved | — |
| S5 | Pen or Finger | Not used |
| S6 | Proximity | 1 = Whiteboard surface is being touched (a touch down or a continued touch). |
| | | 0 = Whiteboard surface is not being |

TABLE 2-continued

Format Tablet Status Bits

| Bit | Description | Values |
|---|---|---|
| | | touched (a touch lift off or inactive). When the proximity bit changes from 1 to 0 (touch lift off), one final set of X, Y coordinate data is output with the proximity bit equal to 0 and the X, Y coordinate data equal to the last touch point. |
| S7 | Packet Synchronization | Always 1. |

Get Parameter Block

Description: Allows access to all power-up and run time parameters used by the controller. The Get Parameter Block (GP) command works in conjunction with the Set Parameter Block (SP) command. This pair of commands is used for configuration and diagnostic purposes. Parameters are retrieved using command GP and modified in data blocks using command SP. The blocks include calibration and initialization data, linearization data, and run time variables.

Mode Stream

Syntax: <SOH>MS<CR>

Description: Causes the controller to send a continuous stream of (X, Y) coordinate data when the whiteboard surface is touched. The controller continues to send data as long as the screen is touched. The controller sends the data even if the touch is stationary and unchanging. The format of the coordinate data depends on the last format command received by the controller.

Response: <SOH>0<CR> Positive response.

Null Command

Syntax: <SOH>Z<CR>

Description: Queries the controller and waits for a response. This command is used to determine if communication with the controller is established. Using this command does not affect the controller's current operating parameters.

Response: <SOH>0<CR> Positive response.

Output Identity

Syntax: <SOH>OI<CR>

Description: Causes the controller to report a firmware identity string, which includes the controller type and the firmware version number.

Response: <SOH>CcXxxx<CR> where:

Cc=two ASCII characters that describe the type of controller. Q1=Serial/SMT3 controller which is available from MicroTouch Systems, Inc., Methuen, Mass.

Xxxx=Four ASCII characters that indicate the firmware version number in decimal format. The first two characters represent the version number; the last two characters represent the revision level. For example, 0100 means Version 1, Revision 0 (that is 1.0) or 0510 means Version 5, Revision 1 (5.1).

Reset

Syntax: <SOH>R<CR>

Description: Initializes the hardware and the firmware, causes the controller to stop sending data, and recalculates the environmental conditions (for example, stray and offset values). The Reset command also cancels the Format Raw and Calibrate Raw commands and returns the touch controller to normal operation. The computer should preferably issue a Reset command whenever it is powered on and is attempting to establish communication with the touch controller. The Reset command may take up to 240 milliseconds (0.25 seconds) to execute. Therefore, the application program should wait at least 250 milliseconds (and receive the command response) before issuing another command to the touch controller following the reset.

Response: <SOH>0<CR> Positive response.

Restore Defaults

Syntax: <SOH>RD<CR>

Description: Causes the touch controller to assume factory default operating parameters. The Restore Defaults command copies the factory default parameters from ROM to the non-volatile memory (NOVRAM) and then executes a Reset command. Table 3 lists the factory defaults. The Restore Defaults command is useful in situations where inadvertent commands to the controller have rendered the whiteboard inoperative.

TABLE 3

Factory Defaults

| Parameter | |
|---|---|
| Data Format | Format Tablet |
| Operating Mode | Mode Stream |
| Serial Settings | N, 8, 1 |
| Baud Rate | 9600 |
| Auto Baud | N/A |
| Finger Mode | Finger Mode |
| Return to Factory Calibration | Yes |

The Restore Defaults command requires approximately 75 to 100 milliseconds, plus the execution time of the Reset command. Accordingly, the host application program should wait a minimum of 350 milliseconds (and receive the command response) before issuing another command to the touch controller.

Response: <SOH>0<CR> Positive response.

Set Parameter Block

Description: Allows access to all power-up and run time parameters used by the controller. The Set Parameter Block (SP) command works in conjunction with the Get Parameter Block (SP) command. This pair of commands is used for configuration and diagnostic purposes. Parameters are retrieved (using GP), and modified (using SP) in data blocks. The blocks include calibration and initialization data, linearization data, and run time variables.

Unit Type

Syntax: <SOH>UT<CR>

Description: Causes the controller to report a controller identity string. This string identifies the type of controller currently attached to the system, lists the features supported by the controller, and outputs the status of the touch controller hardware.

Response: Returns an identification code up to 8 ASCII characters in the following format:

<SOH>TTFfffSs<CR> where:

TT=Two ASCII characters that indicate the controller type, which preferably indicate a Serial/SMT3 controller available from MicroTouch Systems, Inc.

QM=Serial/SMT3 controller

Ffff=Four ASCII characters that indicate the features supported by the controller Asterisks (****) indicate that no additional features are configured.

Ss=Two ASCII characters that provide status information about the touch controller hardware. The two characters represent one byte. Each character is in the range 0 to 9 and A to F.

Table 4 defines the meaning of each bit in the status byte. Each bit can be set to 1 or 0, where:

1=Error

0=No error

00=No diagnostic errors (normal response)

TABLE 4

Bit Definition for the Unit Type Command.

| Bit | Serial/SMT# Status | TouchPen Status |
|---|---|---|
| 0 | Reserved | RAM error. Hardware malfunction. |
| 1 | ROM error. Firmware checksum verification error. | Same. |
| 2 | PWM error. Unable to establish PWM operating range at power up Nonrecoverable error. | Analog-to-digital (A/D) error. The A/D converter malfunctioned. |
| 3 | NOVRAM error. The operating parameters in the controller NOVRAM are invalid. Using defaults. | Same. |
| 4 | HDW error. The controller hardware failed (unable to initialize or configure gate array). Nonrecoverable error. | ASIC error. The Application Specific Integrated Circuit (ASIC) failed. |
| 5 | Reserved. | Reset flag. 1 = A Unit Type command has not been issued since the last reset. 0 = A Unit Type command has been issued Since the last reset. |
| 6 | Cable error. The linearization Data in the cable NOVRAM is invalid. | Reserved. |
| 7 | NOVRAM2 error. The linearization data in the controller NOVRAM is invalid. | Same |

IV. Desktop Software

Figure 4:
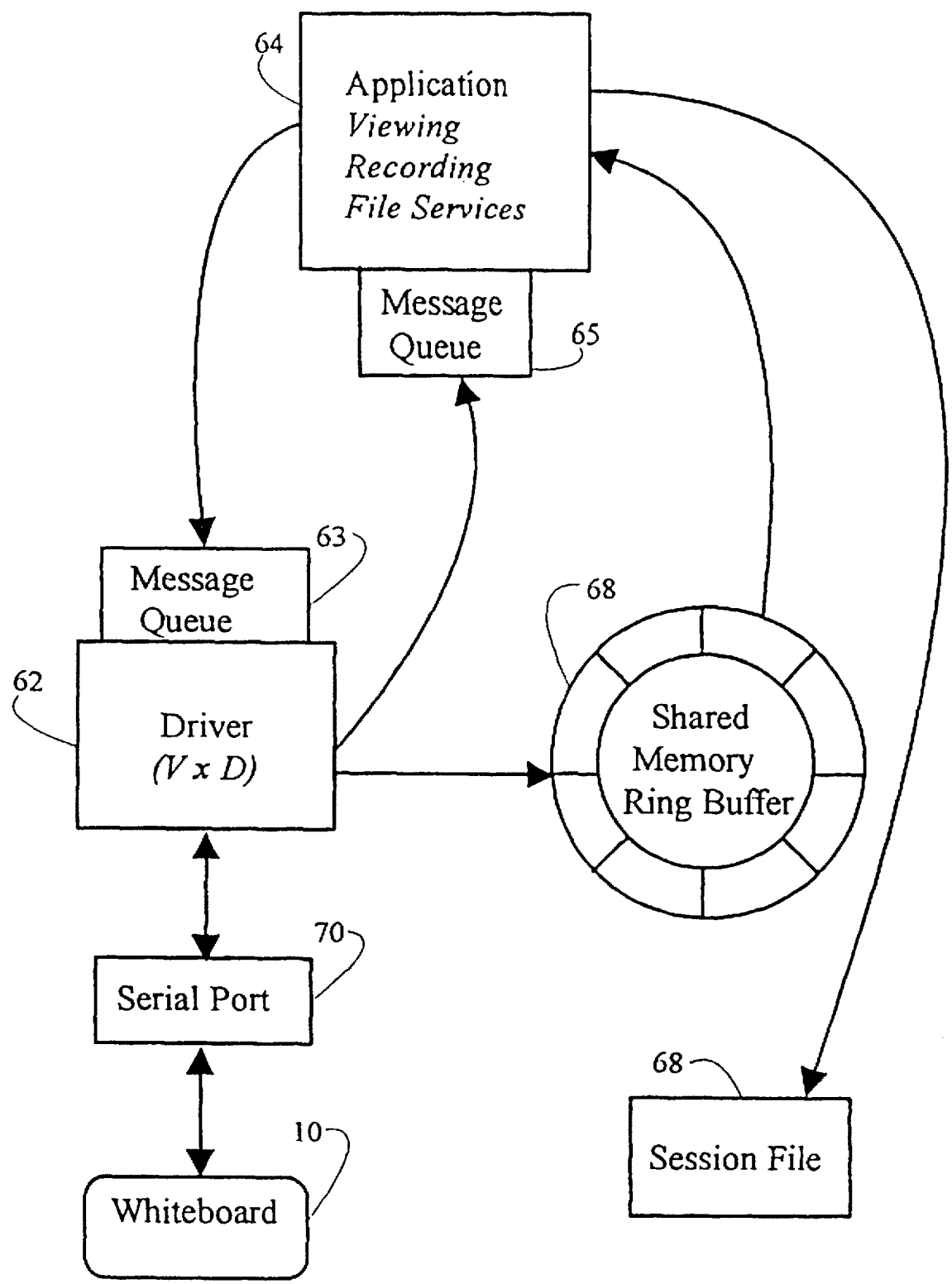
FIG. 4 is a schematic representation of the major functional components of the software application executed by the computer of FIG. 1.

FIG. 4 of the drawings shows a block diagram of the interaction between the application software, shown at 64 and the driver 62 The driver provides the necessary communications support to interface with the whiteboard through serial port 70 at the hardware layer of the PC and an appropriate API interface at the application layer of the PC as described in further detail below. The application software provides all the required functionality for the Graphic User Interface (GUI) and the file system. In a preferred embodiment, the application software operates under the Windows95 or the Windows 3.1 operating system in conjunction with the Win32S extensions, each of which is available from the Microsoft Corporation, Redmond, Wash. Various aspects of developing software to operate under the foregoing operating systems and to utilize the services provided by such systems are described in literature available from the Microsoft Corporation. By way of example, the Visual C development environment available from the Microsoft Corporation may be employed to develop systems employing the features described herein. In the description which follows, numerous acronyms are used in connection with file types, services or protocols employed by the foregoing operating systems. Those skilled in the art will of course understand the meaning of such terms in the context of either of the foregoing Windows operating systems.

Both the driver and the application may be made up of several individual components including DLL files, EXE files, INI files, or similar. The installation software provides all necessary functionality to install the driver and application onto the user's system including detection of a connected whiteboard and configuration of the communication port settings.

The driver takes the form of a virtual device driver (V×D) which receives serial communications data from the whiteboard and passes the resulting assembled messages up to the application. The driver is loaded at Windows startup with the rest of the operating system. At this point, the driver is in memory, however, it does not communicate with the serial port or with the application. The application establishes communication with the driver through a protected mode API. The application can then send the driver commands to execute. The application begins by asking the driver to open the serial port connected to the whiteboard. The driver opens the serial port using VCOMM in Windows 3.1 or (Windows 3.11) and Windows95. In Windows 3.1 or 3.11, the driver does not open the serial port. The driver next sets the serial port up to communicate with the whiteboard by changing the baud rate, etc. and disabling the serial port's interrupt. Then the driver installs an interrupt handler for the Real Time Clock (IRQ 8).

The Real Time Clock, or RTC, generates an interrupt approximately 1,000 times per second by default. The RTC can be set up via the computer's CMOS to run at different rates. The driver modifies the CMOS so that the RTC interrupt gets triggered at a rate of approximately 2,000 times per second. Using this interrupt as a heartbeat, the driver polls the serial port to read data sent from the whiteboard.

This whiteboard data is dealt with in a variety of ways, depending on how the application has instructed the driver to process it. There are several commands that determine how the data gets processed. For example, if the application sends the "start logging" command, the data will be returned to the application via a callback procedure. The callback procedure's address is passed to the driver when the application issues the "start logging" command. The application could also tell the driver to use the data coming in from the whiteboard as input for the mouse by issuing a "set mouse mode" command.

Advantageously, the driver employs polling rather than interrupts to determining if data is available at the serial port. The current standard for IBM compatible PCs is to share IRQ 3 and IRQ 4 between COMM ports 1 through 4. COMM ports 1 and 3 typically share IRQ 4 and COMM ports 2 and 4 typically share IRQ 3. The IRQs are used to signal a serial port that there is data incoming from an external device. The problem with this is that IRQ sharing works only if everything in the system agrees to share. If an application wants to take over IRQ 3 and not share it, the system will allow it, and sharing that IRQ will not be possible. Further, not just applications can be IRQ sharing unfriendly, but motherboards, COMM cards, Modems, or any other serial device can set an IRQ to be non-shareable. These problems cannot be solved with software. Therefore, the ability for a serial communication application to work properly will be highly reliant on the computer on which it is installed. Even if the machine that the application is installed on is IRQ sharing friendly, there are other issues that complicate the matter. For example, IRQs can not signal two ports at once. If COMM port 2 is being used at the same time COMM port 4 is being used, and the ports share IRQ 3, the ports will get notified at a much slower rate. This can lead to data loss from the UART and other timing issues that might interfere with both communication operations.

The polling method is advantageous because the driver does not depend on an interrupt. By not using the interrupt as the method to determine if data is available, and by disabling the interrupts on the serial port being used by the whiteboard, the driver avoids all of the problems with IRQ sharing. The driver will work on any PC regardless of the other devices attached to the system. Another benefit is that it will not interfere with other serial devices. Of course, the PC still has to have at least one serial port available for the whiteboard.

The driver also supports an appropriate API (as described below) to receive messages from the application and transmit that data in serial form back to the whiteboard. The driver supports interrupt sharing to the extent that another serial device driver such as a mouse or modem driver can also receive communications data using the same assigned interrupt.

Figure 6:
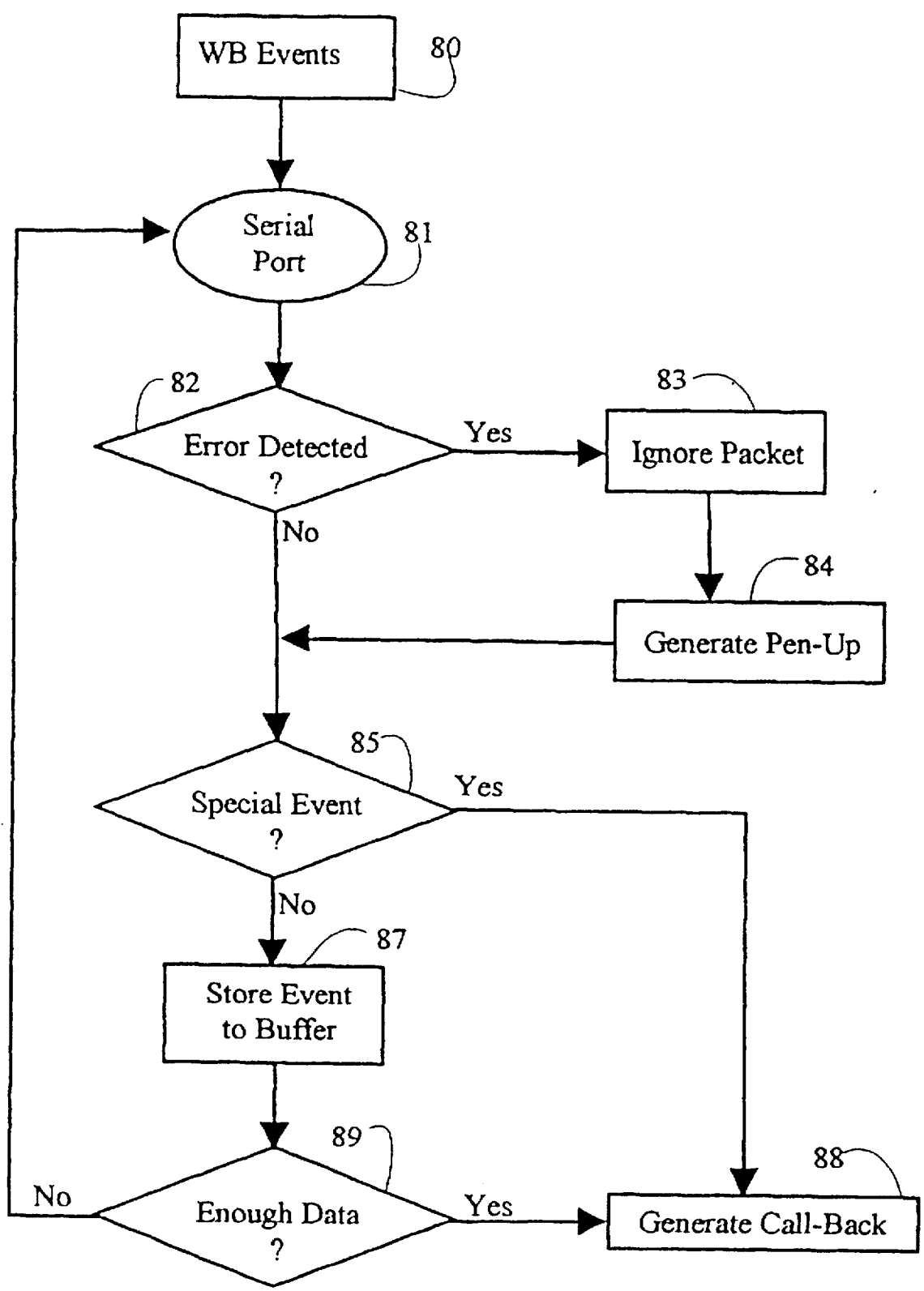
FIG. 6 is a flow chart showing operation of a portion of the software application of FIG. 3.

At predetermined intervals, which in a preferred embodiment is approximately 500 microseconds, the driver 62 polls the serial port to see if information is at the serial port of the PC which is connected to the whiteboard and performs the functions shown in FIG. 6. As seen in FIG. 6, at 80, the driver receives whiteboard events in the form of graphical user inputs entered in writing region 18 and special events entered via button region 20 through serial port 81. At 82, the driver checks the received packet to determine the presence of errors in the five bytes of the packet. As previously noted in connection with the description of the Format Tablet command, the five-byte packet is coded such that the first bit of the first byte is always set to a one value and the first bit of the remaining four bytes is set to a zero value. If a byte is received in which the first bit is set to one, the next four bytes received should each have the first bit set to zero in order for the packed to be considered a valid packet. If a byte is received in which the first bit is set to one and the next four bytes do not start with a zero, then the byte with the first bit set to one and the succeeding bytes are ignored (step 83) until the next byte received has the first bit set to one. Thus, the foregoing procedure advantageously reduces the chance of receipt of false information by the driver in the case of noise which causes data to be lost over the serial link connecting the whiteboard to the computer. If information is ignored due to detection of an error, the driver inserts a pen-up command at step 84 to reduce the possibility of streaking caused by possible loss of a packet containing a pen-up command. If the lost byte did not contain a pen-up command then step 84 will cause a small discontinuity to appear in the image stored by the driver. However, this is believed to be an acceptable trade-off for the alternative of missing a pen-up command which would cause the image stored in the PC to have a line connecting the point at which the lift-off which occurred and was not recorded to the point at which the next valid packet was recorded.

At 85, the WB event is checked to determine if it is a special event and therefore requires immediate action and if so, the driver at 88 generates a call-back to the application 64 to cause the action to be performed. Preferably all events entered in the control region of the whiteboard are special events. Otherwise, at 87, the driver stores the event to a ring type of buffer (seen at 68 in FIG. 3) which is stored in shared memory. In a preferred embodiment, the driver simply distinguishes between data generated at the whiteboard to a sufficient extent to determine if the data is entered in the writing region, or if the data is entered in the control region and if so, if the data entered in the control region requires immediate action. Actual recognition of and action on the event is performed by the application.

Periodically, if the ring buffer contains a predetermined amount of data, the driver will generate a callback for the application to retrieve the information stored in the ring buffer 68 for display and storage to a session file. The special events which require immediate action are the Print event and the Show Board event. The application and driver communicate with one another by passing messages via message queues (seen in FIG. 4 at 65 and 63) associated respectively with the application and driver.

The whiteboard application interacts with the controller by way of a standard library of interface routines implemented by the driver which provide a set of commands to be used by the driver to make use of the input capabilities of the whiteboard 10. In accordance with the invention, a wide variety of application programs in addition to the application program described herein can thus be written to make effective use of the touchscreen using a standard set of easily understood Application Program Interface (API) function calls which may be conveniently expressed in the same language used by the application programmer for conventional programming. The manner in which the API function calls may be made as well as the functions performed and values returned by each of the function calls is explained in detail below:

Application to Driver Communication

The application sends requests to the driver via a routine known as the Protect Mode API routine. The application must be running in a 16-bit environment to access the routine. This means that a 32-bit application will need to thunk down to a 16-bit DLL in order to communicate with the VxD.

The following code may be used to retrieve the driver's Protected Mode API routine address. This code must be in a 16-bit code segment. The following notice applies the code contained herein: Copyright 1996, MicroTouch Systems, Inc.

```
static BOOL GetVxDAPIHandler (void)
{
    char       *szError = NULL;
    WORD       wError = 0;
    /* get API entry to Ibid -- if it is installed */
    _asm
    {
        mov    ax, 1600h                    ; enhanced mode?
        int    2Fh                          ; api call
        test   al, 7Fh                      ; enhance mode running?
        jz     not_running_enhanced         ; no
        mov    ax, 1684h                    ; get device API call
        mov    bx, MTWBS_DEV_ID             ; for the driver
        int    2Fh                          ; get api entry point
        mov    word ptr MTWBS_API, di       ; save the callback address
        mov    word ptr MTWBS_API + 2, es
        mov    ax, es                       ; is the application installed?
        or     ax, ax
        jnz    vxd_installed
        mov    ax, di
        or     ax, ax
        jz     vxd_not_installed            ; if not, split
        mov    wError, 3                    ; if only es is 0 then memory error
        jmp    get_out
    vxd_installed:
        mov    wError, 0                    ; show success (PHERR_NOERROR)
        jmp    get_out
    not_running_enhanced:
        mov    wError, 1                    ; no enh windows! (PHERR_NO386ENH)
        jmp    get_out                      ; return our error code
    vxd_not_installed:
        mov    wError, 2                    ; Ibid? (PHERR_NOVPOSTD)
    get_out:
    }
    /* error checking and reporting */
    if ( wError == 1 )
         szError = "RUN ENHANCED WINDOWS!";
    else if ( wError == 2 )
         szError = "INSTALL Ibid.VxD FIRST!";
    else if ( wError == 3 )
         szError = "MEMORY ERROR! Could not load Ibid.VxD";
    if (wError)
    {
         MessageBox( NULL, szError, "VxD TEST.EXE", MB_OK );
         return ( FALSE );
    }
    return ( TRUE );
}
```

Calling the Driver

The driver provides one interface similar to SendDriverMessage to specify a driver command and the parameters for the command. The API for this function is:

```
static LRESULT   CallVxDAPIService(WORD Api_Selector,
LPARAM lParam1, LPARAM lparam2);
```

This routine passes data via registers. The following code is used to call the driver from the application.

```
static LRESULT    CallVxDAPIService(WORD Api_Selector, LPARAM lParam1,
LPARAM lParam2)
{
    LRESULT          dwReturn = 0;          /* assume the worst        */
    /* sanity check */
    if ( MTWBS_API )
    {
         _asm
         {
         push ax
         push bx
         push cx
         push dx
         push di
         mov   ax, Api_Selector              ; func to call
         mov   bx, word ptr lParam1          ; load lParam1 in to registers
```

```
                mov     cx, word ptr lParam1 + 2
                mov     dx, word ptr lParam2              ; load lParam1 in to registers
                mov     di, word ptr lParam2 + 2
                call    dword ptr |MTWBS_API|             ; call the VxD API Service
    routine
                mov     word ptr dwReturn, ax             ; stuff the return value
                mov     word ptr dwReturn + 2, dx         ; stuff the return value
                pop     di
                pop     dx
                pop     cx
                pop     bx
                pop     ax
                }
        }
        /* return the result */
        return ( dwReturn );
} /* */
```

The Driver Protected Mode APIs

The commands that the driver responds to are listed below with a description of each command, the command's parameters, and the expected return values:

MTWBCMD_NOP

This command is the ID used in the MTWBCMD_GetVxdVersion command to get the driver's version number without a command tag specification, and should not be passed to the driver MTWBCMD_GetVersion Gets the firmware (which is the code executed by the controller) version number. This command can only be executed after the port has been opened with either the MTWBCMD_OpenCommPort or the MTWBCMD_OpenCommPortEx commands.

| lParam1 | ignored |
| lParam2 | ignored |
| Returns: | |

| | The version number of the driver on success |
| 0 | if the Version Number has not been returned from the firmware. The driver will notify the application when the data has been received via the Message Callback |
| 1 | on failure. |

NOTE: The MTWBCMD_GetVersion, MTWBCMD_GetWhiteBoardInfo, MTWBCMD_GetTimeout, and MTWBCMD_SetTimeout commands are sent to the firmware when the driver receives either the MTMTWBCMD_OpenCommPort of the MTWBCMD_OpenCommPortEx commands. Because these commands require immediate feedback from the driver, the driver attempts to obtain the data as soon as possible. It is possible for any one of these commands to be issued before the driver has received the data from the whiteboard because of the delay in receiving data from the whiteboard. In this case, the driver will return 0 to tell the application that it should wait for a notification from the driver that the data is ready. Once the application receives the notification, it can call the driver to obtain the information. If the driver detects that the whiteboard is disconnected from the serial port, then these commands will return −1.

MTWBCMD_SetLoggingMode

This command tells the driver to start logging data received from the whiteboard attached to the sensor identified by lParam1 by calling the callback provided in lParam2. The serial port does not need to be opened to use this command, but the data will not be logged until the port is opened.

lParam1 contains the sensor number, 0 through 4 (where 0 is interpreted as 1) lParam2 contains a far pointer to the callback routine in the application The callback function prototype is:

long PASCAL WhiteboardCallbackEx(long logHandle, TouchPacket FAR *lpPacket);

The TouchPacket FAR* parameter points to the following structure of:

```
struct TouchPacket
{
    WORD    wTabletX;       // X location
    WORD    wTabletY;       // Y location
    WORD    wState;         // Tablet packet header
    WORD    wRepCount;      // repeat count = discarded packets + 1
```

The callback must be located in a locked code segment. It cannot call any Window's API calls except for the PostMessage routine. It cannot access anything but locked data.

The first time the driver calls the callback, it passes NULL for the logHandle. This tells the application that it should return the logHandle identifying which whiteboard the packets belong to. No processing of the packet is done this first time. Every other time that the driver calls the callback, the logHandle will be passed to identify which board the packet came from and the return value will be ignored.

| Returns: | |
|---|---|
| Sensor number | - on success |
| 0 | - on failure |

MTWBCMD_SetMouseMode

This command is used to either query the driver to return the status of mouse mode or to turn mouse mode on or off. When mouse mode is on, the driver uses the touch packets that are being sent by the whiteboard attached to the sensor number passed in via lParam1 as input for the mouse.

lParam1 the sensor number to take the input from, 0 through 4 (where 0 is interpreted as 1) lPram2 0=stop mouse mode, 1=start mouse mode, 2=get mouse mode Returns:

| For lParam2 = 1 or lParam2 = 0 | |
|---|---|
| TRUE | - for success |

```
                    FALSE           - for failure
For 1Param2 = 2
          1                   - for mouse mode ON
          0                   - for mouse mode OFF
```

MTWBCMD_StopLoggingMode

This command tells the driver to stop logging data sent by the whiteboard identified in lParam1.

```
lParam1    Whiteboard Handle (returned from
           MTWBCMD_SetLoggingMode)
lParam2    ignored
Returns:
    TRUE  - on success
    FALSE - on failure
```

MTWBCMD_GetWhiteBoardInfo

This command can be used to get several pieces of information about the setup of the driver and the whiteboard (s). This command can only be executed after the port has been opened with either the MTWBCMD_OpenCommPort or the MTWBCMD_OpenCommPortEx commands.

lParam1 the loword of lParam1 specifies the type of information required. the hiword depends on the information requested.

lParam2 depends on the type of information requested.

This command allows the user to request the following data by passing in the ID as the loword of lParam1:

```
ID   Data to be returned 1    the size of the MTWB_BoardInfo structure.
2    the number of sensors attached to the controller. The driver
     gets this number from the system.ini file under the
     entry "NumberOfBoards".
3    the relative position of sensor 2. The driver gets this number from
     the system.ini file under the entry "LocationBoard2".
4    the MTWB_BoardInfo structure for the whiteboard
     attached to sensor 1.
5    the MTWB_BoardInfo structure for the whiteboard
     attached to sensor 2.
```

These Ids are represented by the following enum:

```
enum MTWBS_INFO {
    MTWBINFO_BoardinfoSize = 1   ,
    MTWBINFO_MultiboardGetnum    ,
    MTWBINFO_MultiboardPos       ,
    MTWBINFO_BoardinfoGet1       ,
    MTWBINFO_BoardinfoGet2       ,
    MTWBINFO_Last
```

When the command is passed to the Driver with the loword of lParam1 equal to 4 or 5, the hiword of lParam1 and lParam2 are used. In both instances, the hiword of lParam1 needs to contain the size of the buffer referenced by lParam2. LParam2 contains a pointer to the start of a MTWB_BoardInfo data structure. The hiword of lParam1 contains the size of the buffer referenced by lParam2. The MTWB_BoardInfo structure is:

```
struct  tagBoardInfo {
    WORD    m_Size;         // drivers idea of the size of this
structure
    DWORD   m_iLeftDrawStart;
    DWORD   m_iRightDrawStart;
    DWORD   m_iTopDrawStart;
    DWORD   m_iBottomDrawStart;
    DWORD   m_iBoardwidth;
    DWORD   m_iBoardHeight;
    DWORD   m_ixResolution;
    DWORD   m_iyResolution;
    DWORD   m_iTBD1;        // futures
    DWORD   m_iTBD2;
};
typedef struct tagBoardInfo    MTWB_BoardInfo;
```

Returns:
When the loword of lParam1=1
    The size of the MTWB_BoardInfo structure
When the loword of lParam1=2
    The number of boards attached to the firmware (the default is 1)
When the loword of lParam1=3
    The relative position of sensor 2 which can be one of the following values:

```
enum MTWBS_POSITION     {
    MTWBPOS_Error               , // Error
    MTWBPOS_Board2IsBelow       , // Board 2 below board 1
    MTWBPOS_Board2IsLeft        , // Board 2 left of board 1
    MTWBPOS_Board2IsAbove       , // Board 2 above board 1
    MTWBPOS_Board2IsRight       , // Board 2 right of board 1
    MTWBPOS_Last                , // The first illegal value
```

The default value is MTWBPOS_Error.
When the loword of lParam1=4 or 5

```
    The size of MTWB_BoardInfo structure    on success
    0   if the whiteboard information has not been returned from the
        firmware. The driver will notify the application when the
        data has been received via the Message Callback
   -1   if the parameters are incorrect or if the whiteboard is
        disconnected
```

NOTE: The MTWBCMD_GetVersion, MTWBCMD_GetWhiteBoardInfo, MTWBCMD_GetTimeout, and MTWBCMD_SetTimeout commands are sent to the firmware when the driver receives either the MTWBCMD_OpenCommPort or the MTWBCMD_OpenCommPortEx commands. Because these commands require immediate feedback from the driver, the driver must attempt to obtain the data as soon as possible. It is possible for any one of these commands to be issued before the driver has received the data from the whiteboard because of the delay in receiving data from the whiteboard. In this case, the driver will return 0 to tell the application that it should wait for a notification from the driver that the data is ready. Once the application receives the notification, it can call the driver to obtain the information. If the driver detects that the whiteboard is disconnected from the serial port, then these commands will return −1.

MTWBCMD_SetSound

This command is used to tell the driver to send a sound command to the firmware. This command can only be executed after the port has been opened with either the MTWBCMD_OpenCommPort or the MTWBCMD_OpenCommPortEx commands.

lParam1 the ID of the sound command to send to the firmware
lParam2 ignored
Oct. 4, 1996

The ID to pass in as lParam1 comes from the following enum:

```
enum MTWBS_SOUND   {
    MTWBSOUND_DoNothing,    // do not send a sound command to controller = 0
    MTWBSOUND_LoudClick,
    MTWBSOUND_LoudHum,
    MTWBSOUND_LoudBeep,
    MTWBSOUND_LoudFlop,
    MTWBSOUND_LoudFanFare,
    MTWBSOUND_SoftClick,
    MTWBSOUND_SoftHum,
    MTWBSOUND_SoftBeep,
    MTWBSOUND_SoftFlop,
    MTWBSOUND_SoftFanFare,
    MTWBSOUND_Quiet,    // make no sound when touched = 8
    MTWBSOUND_Last    // The first illegal value
```

Returns:
 TRUE on success
 FALSE on failure
NOTE: a success when sending a command to the whiteboard's firmware only means that the driver was able to send the command. It does not mean that the firmware will receive the command or act on it appropriately.
MTWBCMD_SetEraseMode This command is used to tell the driver to either set or turn off the erase mode flag in the sound command. The firmware uses a bit in the header of the sound command to determine if the board is in "Erase Mode."

| lParam1 | contains the sensor number, 0 through 4 (where 0 is interpreted as 1) |
|---|---|
| lParam2 | 1=set erase mode, 0=stop erase mode |
| Returns: | |
| TRUE | on success |
| FASLE | on failure |

NOTE: a success when sending a command to the whiteboard's firmware only means that the driver was able to send the command. It does not mean that the firmware will receive the command or act on it appropriately.
MTWBCMD_SetTimeout The application can use this command to write a new time-out value into the Block 1 of the whiteboard's firmware. This command should be used with caution as it overwrites Block 1 data. This command can only be executed after the port has been opened with either the MTWBCMD_OpenCommPort or the MTWBCMD_OpenCommPortEx commands.

lParam1 ignored lParam2 the loword of lParam2 contains the firmware time-out, the hiword of lParam2 contains the driver confirmation interval The loword of lParam2 is the firmware time-out value in seconds. The value must be between 0 and 255. The hiword of lParam2 is the interval, in seconds, for the driver to wait between confirmation requests to the controller. The controller time-out value will be written to the controller's EEPROM making it persistent. The driver confirmation interval is reset to the default value, 60 seconds, or to the value set by the "VerifyTime" entry in the system.ini file each time the driver is loaded. Once the driver is issued either the MTWBCMD_OpenCommPort or the MTWBCMD_OpenCommPortEx command, the driver attempts to read the Block 1 data from the firmware. If reading the Block is successful, then the confirmation interval is set to the VerifTime value contained in the Block 1 data structure.

Returns:
 TRUE on success
 FALSE on failure

NOTE: The MTWBCMD_GetVersion, MTWBCMD_GetWhiteBoardInfo, MTWBCMD_GetTimeout, and MTWBCMD_SetTimeout commands are sent to the firmware when the driver receives either the MTWBCMD_OpenCommPort or the MTWBCMD_OpenCommPortEx commands. Because these commands require immediate feedback from the driver, the driver must attempt to obtain the data as soon as possible. It is possible for any one of these commands to be issued before the driver has received the data from the whiteboard because of the delay in receiving data from the whiteboard. In this case, the driver will return 0 to tell the application that it should wait for a notification from the driver that the data is ready. Once the application receives the notification, it can call the driver to obtain the information. If the driver detects that the whiteboard is disconnected from the serial port, then these commands will return −1.

MTWBCMD_GetTimeout

This command makes the driver read the Block 1 data from the firmware to get the firmware time out value. This command can only be executed after the port has been opened with either the MTWBCMD_OpenCommPort or the MTWBCMD_OpenCommPortEx commands.

| lParam1 | ignored |
|---|---|
| lParam2 | ignored |
| Returns: | |

The firmware time out value on sucess
 0   if the time out information has not been returned from the firmware. The driver will notify the application when the data has been received via the Message Callback
 −1   on failure NOTE: The MTWBCMD_GetVersion, MTWBCMD_GetWhiteBoardInfo, MTWBCMD_GetTimeout, and MTWBCMD_SetTimeout commands are sent to the firmware when the driver receives either the MTWBCMD_OpenCommPort or the MTWBCMD_OpenCommPortEx commands. Because these commands require immediate feedback from the driver, the driver must attempt to obtain the data as soon as possible. It is possible for any one of these commands to be issued before the driver has received the data from the whiteboard because of the delay in receiving data from the whiteboard. In this case, the driver will return 0 to tell the application that it should wait for a notification from the Driver that the data is ready. Once the application receives the notification, it can call the Driver to obtain the information. If the Driver detects that the whiteboard is disconnected from the serial port, then these commands will return −1.

MTWBCMD_OpenCommPort

This command tells the Driver to setup the COM port and take it over (in Windows 3.11 and above). The Driver also installs a Real Time Clock (RBC) interrupt handler. This command must be issued in order for the Driver to communicate with the whiteboard.

| lParam1 | ignored |
|---|---|
| lParam2 | ignored |
| Returns: | |
| TRUE | on success |
| FALSE | on failure |

MTWBCMD_CloseCommPort

This command tells the Driver to release the COM port. The Driver also un-installs the RBC interrupt handler.

| lParam1 | ignored |
|---|---|
| lParam2 | ignored |
| Returns: | |
| TRUE | on success |
| FALSE | on failure |

MTWBCMD_SetLED

The application can use this command to write a new value into the LED status byte. This command can only be executed after the port has been opened with either the MTVBCMD_OpenCommPort or the MTWBCMD_OpenCommPortEx commands.
NOTE: LEDs are not currently supported by the Hardware.

lParam1  the sensor number of the whiteboard to change, 0 through 4 (where 0 is interpreted as 1)
lParam2  loword=pen ID or new value for the whole byte, hiword=the command subtype
The command subtype can be one of the following values:

| 0 | turn the bit specified in the loword off |
|---|---|
| 1 | turn the bit specified in the loword on |
| 2 | set the entire byte to the value from the loword |

Returns:

| Currently | FALSE | |
|---|---|---|
| When implemented | TRUE | on success |
| | FALSE | on failure |

MTWBCMD_Open CommPortEx

This command tells the Driver to setup the COM port specified by lParam1 and take it over (in Windows 3.11 and above). The Driver also installs a Real Time Clock (RBC) interrupt handler. This command must be issued in order for the Driver to communicate with the whiteboard.

| lParam1 | COM port number |
|---|---|
| lParam2 | IRQ number |
| Returns: | |
| TRUE | on success |
| FALSE | on failure |

MTWBCMD_SetMessageCallback

This command is used to setup a message callback into the application. The Driver uses this callback to report errors and to send the application messages.

lParam1 contains the sensor number, 0 through 4 (where 0 is interpreted as 1)

lParam2 contains a far pointer to the callback routine in the application

The callback function prototype is: void PASCAL WhiteboardMessageCallback(long SensorNumber, long MsgCode);

The message code can be one of the following values:

```
enum MTWB_MESSAGE {
        MTWBMSG_NONE            ,
        MTWBMSG_ERR_VERSION     ,
        MTWBMSG_ERR_VIRTUALIZE_RTC ,
        MTWBMSG_TIMEOUT         ,
        MTWBMSG_DISCONNECT      ,
        MTWBMSG_RECONNECT       ,
        MTWBMSG_ERR_PORT_READ   ,
        MTWBMSG_ERR_PORT_WRITE  ,
        MTWBMSG_ERR_QUEUE_PUT   ,
        MTWBMSG_ERR_QUEUE_GET   ,
        MTWBMSG_ERR_INPUT_DATA  ,
        MTWBMSG_WBINFO_READY    ,
        MTWBMSG_LAST
};
```
Returns:

| Sensor number | - on success |
|---|---|
| 0 | - on failure |

MTWBCMD_GetVxdVersion

This command is used to get the version number of the Driver and whether a particular command is supported by the Driver.

lParam1 is the number of the command to be checked
lParam2 is a pointer to the command's tag
LParam1 can be one of the following values:

```
enum MTWBS_COMMAND {
        MTWBCMD_NOP = -1        ,
        MTWBCMD_GetInfo         ,
        MTWBCMD_SetInfo         ,
        MTWBCMD_GetName         ,
        MTWBCMD_GetVersion      ,
        MTWBCMD_DisplayInfo     ,
        MTWBCMD_SetLoggingMode  ,
        MTWBCMD_SetMouseMode    ,
        MTWBCMD_StopLoggingMode ,
        MTWBCMD_GetWhiteBoardInfo ,
        MTWBCMD_SetSound        ,
        MTWBCMD_SetEraseMode    ,
        MTWBCMD_SetTimeout      ,
        MTWBCMD_GetTimeout      ,
        MTWBCMD_OpenCommPort    ,
        MTWBCMD_CloseCommPort   ,
        MTWBCMD_SetLED          ,
        MTWBCMD_OpenCommPortEx  ,
        MTWBCMD_SetMessageCallback ,
        MTWBCMD_GetVxdVersion   ,
        MTWBCMD_RemoveMessageCallback ,
        MTWBCMD_Last
};
```

Use MTWBCMD_NOP to get the Driver's version number without the need to specify a command tag.

LParam2 can be one of the following values:

| | |
|---|---|
| #define MTWBCMD_TAG_GETINFO | (VOID FAR*) "GetInfo" |
| #define MTWBCMD_TAG_SETINFO | (VOID FAR*) "SetInfo" |
| #define MTWBCMD_TAG_GETNAME | (VOID FAR*) "GetName" |
| #define MTWBCMD_TAG_GETWBVERSION | (VOID FAR*) "GetWbVersion" |
| #define MTWBCMD_TAG_DISPLAYINFO | (VOID FAR*) "DisplayInfo" |
| #define MTWBCMD_TAG_SETLOGGINMODE | (VOID FAR*) "SetLoggingMode" |
| #define MTWBCMD_TAG_SETMOUSEMODE | (VOID FAR*) "SetMouseMode" |
| #define MTWBCMD_TAG_STOPLOGGINMODE | (VOID FAR*) "StopLoggingMode" |
| #define MTWBCMD_TAG_GETWHITEBOARDINFO | (VOID FAR*) "GetWhiteBoardInfo" |
| #define MTWBCMD_TAG_SETSOUND | (VOID FAR*) "SetSound" |
| #define MTWBCMD_TAG_SETERASEMODE | (VOID FAR*) "SetEraseMode" |
| #define MTWBCMD_TAG_SETTIMEOUT | (VOID FAR*) "SetTimeout" |
| #define MTWBCMD_TAG_GETTIMEOUT | (VOID FAR*) "GetTimeout" |
| #define MTWBCMD_TAG_OPENCOMMPORT | (VOID FAR*) "OpenCommPort" |
| #define MTWBCMD_TAG_CLOSECOMMPORT | (VOID FAR*) "CloseCommPort" |
| #define MTWBCMD_TAG_SETLED | (VOID FAR*) "SetLED" |
| #define MTWBCMD_TAG_OPENCOMMPORTEX | (VOID FAR*) "OpenCommPortEx" |
| #define MTWBCMD_TAG_SETMESSAGECALLBACK | (VOID FAR*) "SetMessageCallback" |
| #define MTWBCMD_TAG_GETVXDVERSION | (VOID FAR*) "GetVxdVersion" |
| #define MTWBCMD_TAG_REMOVEMESSAGECALLBACK | (VOID FAR*) "RemoveMessageCallback" |

Returns:

| | |
|---|---|
| version number | if the command is supported (internal command tag for the specified number is the same) |
| 0 | if command is not supported |

MTWBCMD_RemoveMessageCallback

This command tells the Driver to stop sending messages generated from the whiteboard identified in lParam1.

| | |
|---|---|
| lParam1 | Whiteboard Handle (returned from MTWBCMD_SetMessageCallback) |
| lParam2 | ignored |

Returns:

TRUE - on success
FALSE - on failure

The Session File

Figure 5:
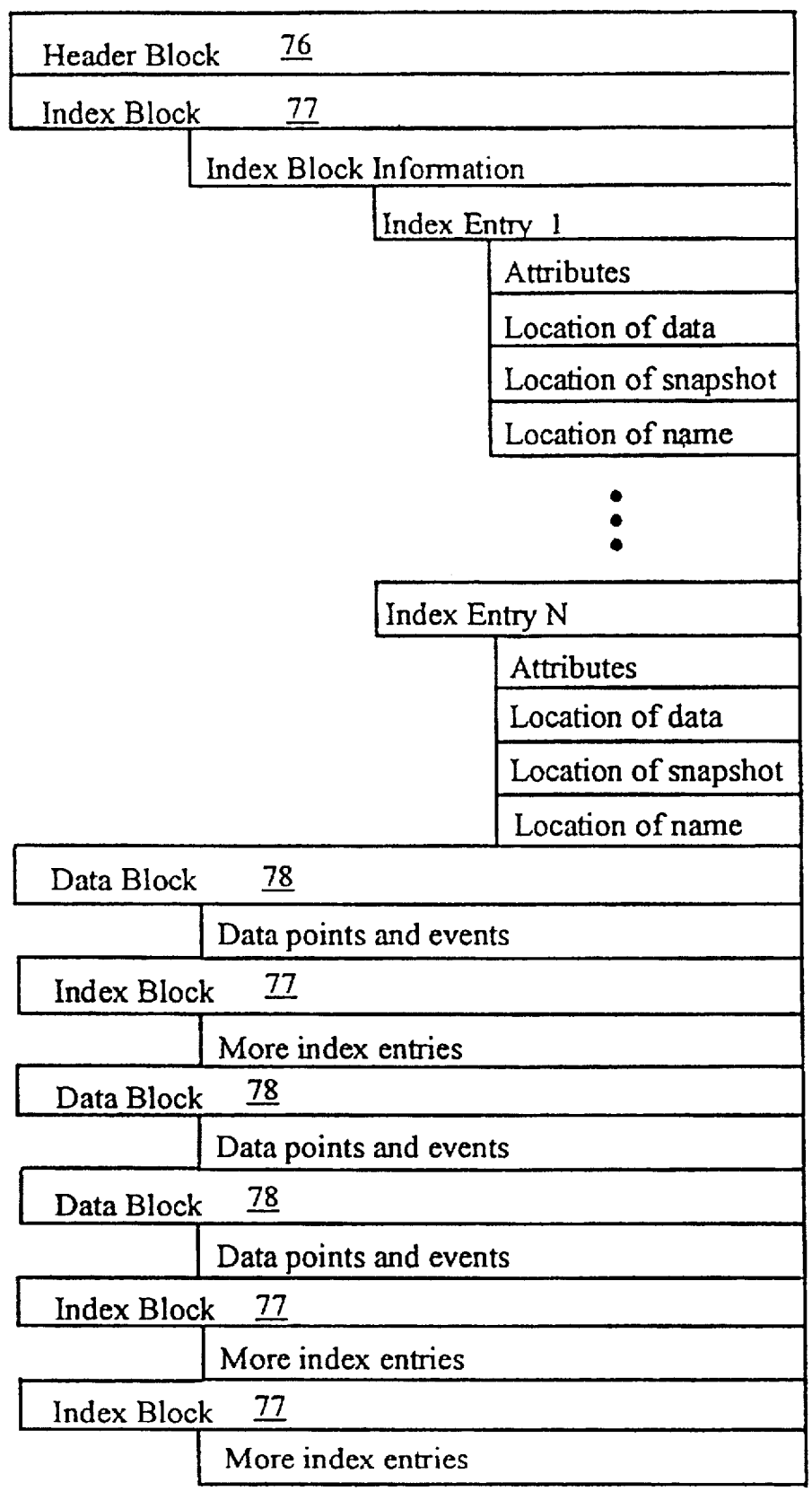
FIG. 5 is a block diagram of the session file of FIG. 4.

FIG. 5 of the drawings shows the format of the session file. The session file consists of three main elements: the file header 76 which describes the file; the index blocks 77 which hold the entries that define the images; and the data blocks 78 which hold all the data used to generate the images, including the color and writing tool changes. The data blocks 78 and index blocks 77 are created as needed. The header block 76 provides general information that applies to the overall file, including the metrics of the whiteboard, the eraser sizes used in the file, the size of the snapshot bitmaps stored in the file, and the file identification. The size of the header is 1,024 bytes. There is only one header block per file. The index blocks contain index entries pertaining to each image in the file and special event identifiers. Each index block contains a header that describes the location of the next and previous index blocks. An index entry determines how the image was created, either via the snapshot button or erase-all button. The index entry contains the snapshot bitmap in compressed format, a variable length name of the image, the starting and ending location of the data in the file, the date and time it was created, along with other attributes. An index entry can vary in size, but the index blocks are set to 65,536 bytes. The size is larger because the snapshot bitmaps are stored in the index block. The data blocks contain all the data used to generate the image. The data is made up of data points that are stored in a compressed format. There is an absolute point followed by relative points. This series of points makes up a vector. There are special event data items that signify a color or mode change. A data block is 4,096 bytes.

Advantageously, the session file contains the information necessary to recreate the sequential and temporal relationships generated upon entry of information via the whiteboard. For example, each stroke entered upon the writing region, including eraser strokes is saved in the session file, together with the temporal relationships necessary to recreate each stroke. Thus, the session file allows the subsequent viewing and editing, stroke by stroke, of an image. Strokes with the eraser may be selected, viewed, and removed, as may strokes with a marker or the user's finger. In addition, storage of temporal information allows use of handwriting recognition software. Display of an image created on the whiteboard on a computer display may be performed by display of each stroke stored in the session file. Thus, a stroke with a marker is displayed in accordance with the color designated for that marker in the session file, and a stroke with an eraser is displayed in white in accordance with the width of the chosen eraser (narrow or wide).

Application Component

The application component provides all the functionality (not contained within the driver) to support the operation of the whiteboard. This includes GUI, file system management, API communications, process control, etc.

At startup, the application runs minimized (default condition), or as the foremost window on the display 13 (user selectable option). A pre-defined button (ShowBoard) is provided at the whiteboard to bring the minimized window forward and display the current state of the recording process. The application responds to this button by restoring itself to primary focus and displaying the current board image as seen in FIG. 1.

A logger function within the application receives streams of whiteboard events from the driver (the exact structure of the data is described above), representing the coordinates of the current writing activity of the user. Redundant points and superfluous points (i.e., closely spaced co-linear) are removed from the data stream by the driver prior to storage of the data to the session file, thus providing a limited zero loss data compression mechanism. For example, if the user presses and holds a finger or marker to the surface of the whiteboard at a particular point so as to cause repeated generation of the same data to indicate the action, the logger function will receive only the first instance of the data and will record a value indicative of the number of times the point was repeated. In addition, if the driver receives a first coordinate and a second coordinate, within an adjustable range of the first coordinate, then the second coordinate will be discarded and only the first will be sent to the logger. Those skilled in the art in view of the present disclosure will appreciate that other methods may be employed to eliminate redundant and superfluous points.

At predetermined times or events (defined by the user) the application inserts a bookmark into the data stream, effectively marking the current board state for review. The display application provides a snapshot view of each bookmarked board state. The user may explicitly place a bookmark via a soft button. The application also provides appropriate automatic bookmarks for events such as "erase all" as described further herein.

Graphical User Interface (GUI)

The application provides a true Single Document Interface (SDI) interface but also permits a split window capability as described further herein. The window layout is similar to that shown in FIG. 1. The application provides three primary viewable elements in the SDI window: selection view, snapshot list control, and current board thumbnail.

The selection view is a sub-divided region of the application SDI and provides the primary means to view any snapshot within the current session file. The view region allows the image magnification to be adjustable from the view menu or toolbar buttons and its size is adjustable by moving of splitter bars. The aspect ratio of the viewed image is preserved (default) unless the user chooses otherwise through a preference setting. The default background color of the selection view is white with colored pen strokes. The width of the displayed pen strokes is adjustable by a user preference. The displayed and stored width of erase strokes are separately adjustable by a user preference. The selection view displays either a selected snapshot from the list control, or the current board image from the current board snapshot.

The current board view is also a sub-divipro region of the application SDI and provides the secondary means to view the current state of the whiteboard. The view size is adjustable by moving the splitter bars, and the aspect ratio of the view is preserved (default) unless the use chooses otherwise through a preference setting. The default background color of the current board view is also white with colored pen strokes. The border of the view is an adjustable graphic representation of the actual whiteboard. The current board view is updated frequently to show substantially real-time drawing activity at the board.

The snapshot list control comprises a third subdivided portion of the application SDI and provides the primary means to sort and view the set of snapshots stored in the current session file. The snapshot list control size is adjustable by moving appropriate splitter bars. The bitmap resolution of each snapshot remains fixed allowing more or fewer snapshots to be visible when the list control size is adjusted. The default background color of the list control is dark gray and the default background color of each snapshot is white with colored pen strokes. The snapshots are selectable using standard Windows mouse and keyboard sequences. Selection options include one, several contiguous, several individual, or all. The meaning of this selection process changes for different desired actions in accordance with conventions imposed by the particular Windows operating system. For instance, if an image is dragged to another application, only the last selected image will be dragged to the other application. During a move or append, all selected snapshots are moved or appended in the order selected, and if copied to clipboard, and pasted, all selected snapshots reappear when pasted in the order selected.

Scrollbars are provided as appropriate for navigating through the available list of snapshots. An editable name field is displayed along with each snapshot. By default, this field is initialized to the snapshot creation time and creation date. This time and date information is displayed using a small floating tool tip window when the mouse cursor rests over a snapshot. This feature allows the user to rename snapshots without losing access to the creation date information. The title bar of the snapshot list control displays the text "Saved Images: N" where "N" is the number of snapshots.

The GUI provides the necessary Object Linking & Embedding (OLE) functionality to allow a snapshot to be selected and dragged by the mouse into another open OLE aware application. This action results in the contents of that snapshot being pasted into the target application. The GUI also provides the necessary functionality to allow a snapshot to be selected and dragged by the mouse onto a desktop button or program icon (as appropriate) to launch the target program with a copy of the contents of that snapshot.

The GUI provides the necessary functionality to allow snapshots to be reordered and deleted within the list control. This user accomplishes this task by selecting the target snapshot and then either dragging it to the desired location within the list control or by pressing the "delete" key to remove it. Deletion of multiple selected snapshots is also supported. By default, a dialog box is used to confirm a delete action. Deleted snapshots are not recoverable.

The GUI provides the necessary functionality to allow users to temporarily hide selected snapshots. Hidden snapshots remain book marked in the session file but they are not shown in the list control unless the view menu option to show hidden snapshots is enabled. In this case, hidden snapshots are shown with a special border to indicate their hidden state.

The GUI preferably provides, the following menu items:

File Menu

The file menu provides options for new, open, save, save as, close, export image, print, Print Preview, Print Setup, list of most recent previously opened files, exit,. The close function causes the current whiteboard file to be closed and a new untitled file to be created.

Edit Menu

The edit menu provides options for copy, append image(s) to . . . , move image(s) to . . . delete, select all, hide, unhide, unhide all, snapshot, options. When the current board has the focus: export, copy, append image(s) are enabled and move image(s) to, delete and cut are grayed. The append image(s) to function takes the currently selected image and adds a copy of it with stroke context to the selected target session file. This operation (if successful) is then confirmed by a modal dialog box informing the user that the append was successful. When the current selection is the current board view, it becomes the current board view in the target session file. The current board in the target session file is preserved as a snapshot. When the current selection is a snapshot or snapshots, the image(s) are copied into the target file and appear as the last snapshots in the target file. The current board remains unchanged in the target file.

The Move image(s) to function takes the currently selected image and adds a copy of it with stroke context to the selected target session file. The currently selected image is then deleted from the current session file. This operation (if successful) is then confirmed by a modal dialog box informing the user that the move was successful. When the current selection is the current board view, this function is disabled. When the current selection is a snapshot or snapshots the image(s) are copied into the target file and appear as the last snapshots in the target file. The current board remains unchanged in the target file.

The cut function allows the user to delete a selected thumbnail and place it on the clipboard at the same time. The cut function is disabled (grayed) if multiple thumbnails are selected. The cut function does not operate on the current board image.

View Menu

The view menu provides options for toolbar, thumbnail list, status bar, current board, screen layout . . . hidden thumbnails, zoom in, zoom out, Help Menu The help menu provides options for index and about.

Toolbar Buttons

The GUI includes a moveable toolbar. The functions supported by buttons include new, open, save, print, thumbnail, cut, copy, current board, slide view, regular view, full screen, zoom in, zoom out, size to window, and context sensitive help.

Status Bar

The GUI includes a status bar which provides assistance to the user by indicating the current state of the application and the creation date and time of a selected thumbnail.

The application supports printing of single and multiple images (one per page) on any properly Windows configured color or monochrome graphics printer. Printing options include the current board image, a group of snapshot images from a multiple selection or all images in the current file including the current board.

A printing dialog box includes options to specify the page header and footer by means of pull down menus and editable text boxes. Formatting of the header and footer may be accomplished by way of embedded control characters which allow various format of date and time representative of either the current date and/or time or the creation date and or time. Other control characters allow specification of fonts, font attributes such as bold, italics, and font size. The application provides a print preview screen with zoom controls to allow the user to preview the target print action. The GUI provides two levels of on-line user help: general searchable, and context sensitive. The GUI provides three view selection buttons in the toolbar. These buttons provide the means to switch the GUI between a normal layout view, a full screen slide sorter view, and a full screen page by page (or slide by slide) view.

File System Management

The application stores all board drawing and erasing activity sequentially in a data file called a "session" file. Only one session file is open at any time and all board activity is added to the logical (not necessarily physical) end of that file. Management of this file is consistent with a SDI product except where noted herein. This file contains all the necessary information to recall and view snapshots, and to navigate between bookmarks stroke by stroke. The file system supports deletion, hiding, and re-ordering of thumbnails. The file system is advantageously designed to minimize the loss of data in the event of abnormal process termination. Temporary files and flags are used to restore the previous state of the application and file system when the application is restarted after an abnormal process termination. The default file for board data input is the last active session file before the application was closed. The file format accommodates the following: (1) a vector list, containing individual strokes written on the whiteboard; (2) time stamping of written data; (3) resolution of at least 4000 points in both X and Y dimensions; and (4) snapshot images stored as bitmaps.

Session File Control Actions

The application preferably supports, the following user initiated file control actions.

NEW—A new empty session file is created whenever the user selects "new" from the file menu. The current session file is closed with a default book mark added to the end, and all subsequent board action goes into this new untitled file. The user is given the option of keeping or discarding unsaved changes in the current, to be closed session file. Under default conditions, the current board image does not carryover into the new file. However, an option may be provided to allow the user to change this default behavior using option settings.

OPEN—A previously created and currently closed session file is re-opened for viewing and board data input. The current session file is closed with a default book marked added to the end, and all subsequent board action go into this re-opened file. The user is given the option of keeping or discarding unsaved changes in the current, to be closed session file.

SAVE—This function permanently commits any unsaved changes in the current session file. The changes include added, re-ordered, hidden, deleted thumbnails and any board drawing data since the last save.

SAVE AS—This function creates a complete copy of the current session file and begins using the new copy for all further board and editing activity. Any unsaved changes in the current session file go into the newly created copy, not the original file.

APPEND IMAGE TO—This function allows the user to append a copy of the currently selected image to the end of another session file.

MOVE IMAGE TO—This function allows the user to append a copy of the currently selected image to the end of another session file and then immediately delete the currently selected image from the current session file.

Data Preservation

A priority in the file system design is the preservation of user whiteboard data. The design incorporates appropriate redundancy techniques to ensure that minimal data is lost in the event of system crashes, etc. An unsaved, untitled session file is shadowed by a hidden temporary file to ensure data recovery until the user actively decides to save or throw away that new session file.

Data Compression

The software is designed to use various data compression techniques including run length encoding to minimize disk space used by the session files.

Exporting Data

The application supports three methods for exporting data: Clipboard, file, OLE drag & drop. These include the ability to copy the current selected image to the clipboard and to export the current selected image to a graphic file. Graphic formats for all three methods include at least bitmap (.BMP) and Windows metafile (.WMF).

Advanced Features

The application supports a set of advanced features which are disabled by default at normal installation. These features are activated by some sort of selection within the Options dialog. Once enabled, these advanced features provide support for the following functions as a minimum:
a) Bookmark Editing—The ability to edit the properties of a bookmark through a dialog.
b) Stroke Navigation—The ability to navigate through a file stroke by stroke and page by page using the arrow keys, page keys, and toolbar icons.
c) Mouse Events—When enabled through a separate check box, this feature outputs mouse cursor movements and left mouse select messages from the whiteboard driver to the Windows OS.

Optional Settings

The application provides an "Options" selection item from the edit menu that will then produce a tabbed notebook style series of dialogs. The following parameters, as a minimum, are selectable:

a) Preserve Board Drawing Aspect Ratio.
b) Override Screen Saver On Drawing Activity.—The default value for this feature is enabled.
c) Save settings and screen layout on exit
d) Select Marker and Eraser widths
e) Override Pen widths
f) Switch to default drawing mode.—This feature defines the number of minutes and seconds which should elapse before the drawing state of the board defaults to black pen. The default value should be 2:00 minutes.
g) Bookmark after n idle minutes.—This feature is disabled by default
h) Sounds.
i) Show hidden images.
j) Use previous file on startup.—This feature is disabled by default Pen & Eraser Width Settings As previously noted, the application supports user selection of the pen and eraser widths. One width is supported for or all four pen colors. There is a separate defined width for the wide eraser and for the narrow eraser. The eraser widths are stored in the session file and are always displayed as they were recorded. The pen widths are also stored in the session file and are always displayed as they were recorded unless the user chooses a selection to override the displayed pen width values. The override does not affect the values previously stored.

When the user changes any width value, the change applies from that time forward in the recording process. There is no requirement to edit previously stored widths.

Figure 7:
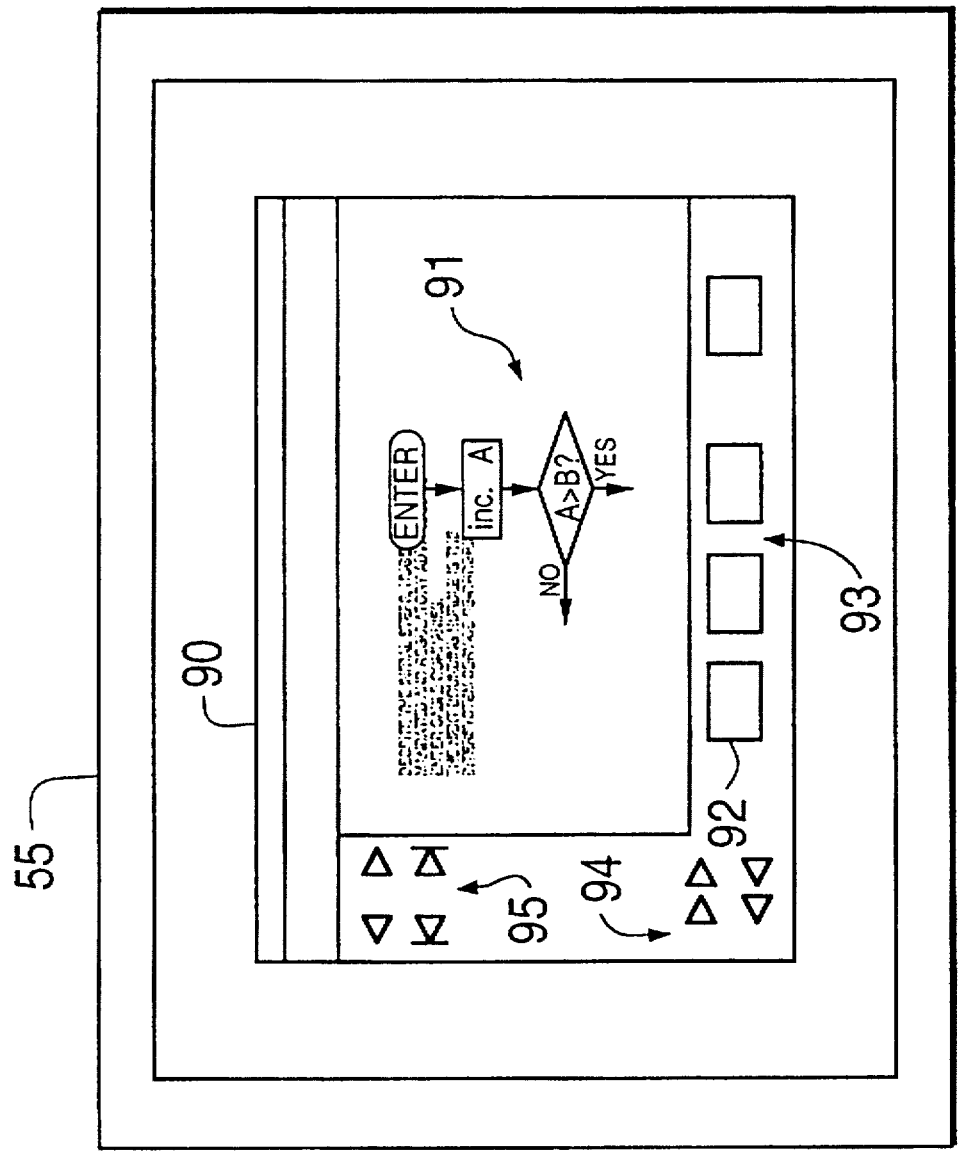
FIG. 7 is a schematic block diagram of an alternative implementation of the whiteboard application software of FIG. 1.

It is to be understood that the specific mechanisms and techniques which have been described are merely illustrative of one application of the principles of the invention. Numerous modifications may be made to the methods and apparatus described without departing from the true spirit and scope of the invention. For instance, as shown in FIG. 7, the GUI may take other forms. In FIG. 7, the window 90 advantageously displays the image 91 entered by the user upon the whiteboard 10. A plurality of thumbnail images, which are reduced versions of images entered via the whiteboard are shown at 92 and 93. The thumbnail image shown at 92 is representative of the image being displayed (the active image) by the viewer. Thus, in the example shown in FIG. 7, the thumbnail 92 is a reduced image of image 91 Any one of the thumbnail images such as 93 may be made the active image to replace image 92 by selection of the thumbnail image by well known technologies employed by users of the Windows operating system to select particular items. Additional thumbnails may be displayed by use of the button images shown at 94. These buttons allow the user to cause the thumbnails shown at 92, 93 to change in response to the particular button selected. For example, the user may move backward through the thumbnails to view thumbnail images created prior to the thumbnail currently displayed. The user may also move forward through the thumbnails to view only the most recently creates thumbnails. Thus, the thumbnail images and buttons 94 allow the user to rapidly retrieve and view a plurality of images, to select an image for further viewing, printing, manipulation, etc.

Buttons 95 allow for viewing of sequences with a particular active image. For example, each stroke of the marker 24 may be replayed sequentially, to allow viewing of the sequence of strokes which caused generation of an image such as shown at 91 Thus by use of buttons 95, status corresponding to the active image may be added or removed thus allowing editing of the image. For instance, certain portions of the image 91 may be removed, and the resulting image displayed on the viewer may then be stored, printed or transmitted.

In addition, the particular structure of the software described herein may also be modified within the principles of the present invention. For example, the functions performed by the application may be performed by a plurality of programs, such as a recorder program which executes on the PC to record all actions on the whiteboard and a viewer program which may be invoked from time to time to view and manipulate images recorded by the recorder. Functions performed by the driver and application may be reallocated in other ways also.

Additional modifications will also be apparent to those skilled in the art in view of the disclosure contained herein.

What is claimed is:

1. A whiteboard comprising:
a drawing area on the whiteboard's surface upon which a user may draw using a writing instrument of a type generally used with whiteboards;
a plurality of touch-selectable control areas on the whiteboard's surface, the plurality including at least
a first control area which, when selected, indicates a color and
a second control area which, when selected, indicates a view mode;
means, responsive to drawing activity by said user in said writing area for causing transmission of information representing said drawing activity to a computer;
means, responsive to selection of said first control area for causing transmission of pen color information to said computer which is indicative of a pen color selected by said user for said drawing activity in said information subsequent to said selection; and
means, responsive to selection of said second control area, for causing transmission of a command to said computer which causes said computer to display a current image made from said information on a display.

2. A whiteboard as set forth in claim 1 further wherein
said user may erase a drawing in the drawing area using an erasing instrument of a type generally used with whiteboards and the whiteboard further comprises:
a third control area which, when selected, indicates an erase mode; and
means, responsive to selection of said third control area, for causing transmission of a command to said computer to interpret subsequent said drawing activity as erasure of an area in said writing area and to respond thereto by erasing a corresponding area in said current image.

3. A whiteboard as set forth in claim 2 wherein said third control area indicates a narrow erase mode when selected and said whiteboard further comprises:

a fourth control area which, when selected, indicates a broad erase mode; and means, responsive to selection of said fourth control area, for causing transmission of a command to said computer to interpret subsequent said drawing activity as erasure of an area in said writing area, said computer interpreting said subsequent said drawing activity in said information as causing erasure of a larger area and a larger corresponding area than if said subsequent drawing activity had been subsequent to selection of said third control area.

4. A whiteboard as set forth in claim 1 further comprising:

a fifth control area which, when selected, indicates a snapshot, means, responsive to selection of said fifth control area, for causing transmission of a snapshot command to said computer to cause said computer to store marker information which causes said computer to interpret a portion of said information designated by said marker information as comprising a snapshot image.

5. A whiteboard as set forth in claim 4 further comprising:

a sixth control area which, when selected, indicates a snapshot and erasure of a display of said current image; and means, responsive to selection of said sixth control area, for causing transmission to said computer of said snapshot command, and for causing transmission to said computer of a command which causes said current image to be entirely erased in said display.

6. A whiteboard as set forth in claim 1 further comprising:

a seventh control area which, when selected, indicates that said drawing activity being displayed in said display is to be printed on a printer accessible from said computer; and means, responsive to selection of said seventh control area, for causing transmission to said computer of a command which causes said computer to cause printing of an image corresponding to said current image.

7. Apparatus for responding to first inputs received from a touch sensitive white board and second inputs, the whiteboard having a drawing area on the whiteboard's surface upon which a user may draw using a writing instrument of a type generally used with whiteboards and a plurality of touch-selectable control areas on the whiteboard's surface, the control areas including at least a view mode selection area, a color selection area, and a print selection area, the apparatus comprising:

means for causing generation of a window for display on a display responsive to said apparatus, said window including a current board region which contains a current image corresponding to current drawing inputs of the first inputs by a user upon said drawing area of said whiteboard, a snapshot region which contains a plurality of snapshots viewable by said user, each of said snapshots representative of past drawing inputs on said drawing area of said whiteboard, and a selection region which shows a snapshot image corresponding to a snapshot selected by said user from said snapshot region;

means, responsive to user size change inputs of the second inputs, for causing the size of said current board region, said snapshot region and said selection region to be changed in accordance with said user size change inputs;

means, responsive to an input of the first inputs entered in said view mode selection area for causing said window to be displayed as a foreground window on said computer screen;

means, responsive to an input of the first inputs in said color selection area, for causing storage and display of subsequent said current drawing inputs in a color selected by said input in said color selection area; and means, responsive to a print selection input of the first inputs in said print selection area, for causing printing of said current image.

8. Apparatus for responding to first inputs received from a touch sensitive white board and second inputs, the whiteboard having a drawing area on the whiteboard's surface upon which a user may draw using a writing instrument of a type generally used with whiteboards and a plurality of touch-selectable control areas on the whiteboard's surface, the control areas including at least a display mode selection area, a color selection area, and a print selection area, the apparatus comprising:

means for storing current drawing inputs of the first inputs by a user upon said drawing area to a computer file, and for periodically storing time stamps in said file to provide an indication of a date and time at which said current drawing inputs are stored to said computer file;

means, responsive to control area inputs of said first inputs received from said touch-selectable control areas, for causing display of a current image corresponding to said current drawing inputs in a graphical window on a display responsive to the apparatus, and means responsive to a subsequent user generated view input of said second inputs for causing enlargement of said window, comprising, means responsive to a color selection control area input, for displaying an image corresponding to subsequent current drawing inputs in a color corresponding to said color selection control area input;

means responsive to a wide erase control area input, for causing existing current drawing inputs to be erased in accordance with subsequent current drawing inputs;

means responsive to a narrow erase control area input, for causing existing current drawing inputs to be erased in accordance with subsequent current drawing inputs, said narrow erase input causing erasure of said existing current drawing inputs along a path which is narrower than said erasure caused in accordance with said wide erase input; and means, responsive to an erase board control area input for causing all existing current drawing inputs to be erased;

means, responsive to a bookmark control area input, for causing a bookmark to be stored in said computer file among said drawing inputs;

means, responsive to a print control area input, for causing said apparatus to transmit to a printer data for causing said printer to print said current image;

means, responsive to a retrieve input of the second inputs, for causing display of an image corresponding to said drawing inputs which are stored between a pair of said bookmarks; and means, responsive to initiation of said means for causing display of said current image, for causing a plurality of thumbnail size images of sets of prior drawing inputs, each of said sets comprising drawing inputs which are stored between a pair of said bookmarks, to be displayed in said window.

9. The white board set forth in any one of claims 1 through 6 wherein:

said surface of said whiteboard is touch-sensitive.

10. A touch-sensitive whiteboard which may be coupled to a computer that has a display and that responds to inputs from the whiteboard, the white board comprising:

a drawing area on the whiteboard's surface upon which a user may draw using a writing instrument of a type generally used with whiteboards;

a plurality of touch-selectable control areas on the whiteboard's surface, the plurality including at least a first control area which, when selected, indicates a color and a second control area which, when selected, indicates a view mode; and means for causing transmission of positions of touch inputs to the computer, the computer responding when the whiteboard is coupled thereto to a touch input positioned in the first control area by associating the color indicated by the first control area with subsequent touch inputs in the drawing area and to a touch input positioned in the second control area by displaying a current image made using touch inputs from the drawing area.

11. The whiteboard set forth in claim 10 wherein the user may erase what has been drawn in the drawing area using an erasing instrument of a type generally used with whiteboards; and the whiteboard further comprises:

a third control area which, when selected, indicates an erase mode, the computer responding to a touch input positioned in the third control area by interpreting subsequent touch inputs as erasures of an area in said writing area and erasing a corresponding area in the image.

12. The whiteboard set forth in claim 11 wherein the third control area indicates a narrow erase mode when selected; and the whiteboard further comprises:

a fourth control area which, when selected, indicates a broad erase mode, the computer responding to a touch input positioned in the fourth control area by interpreting subsequent touch inputs as erasures which are broader than erasures made in response to selection of the third control area.

13. A whiteboard as set forth in claim 10, the whiteboard further comprising:

a fifth control area which, when selected, indicates a snapshot, the computer responding to a touch input positioned in the fifth control area by storing a sequence of the touch inputs for use in making a snapshot image.

14. A whiteboard as set forth in claim 13, the whiteboard further comprising:

a sixth control area which, when selected, indicates a snapshot and erasure of the current image, the computer responding to a touch input positioned in the sixth control area by storing a sequence of the touch inputs used to make the current image for use in making a snapshot image and deleting the current image from the display.

15. A whiteboard as set forth in claim 10 further comprising:

a seventh control area which, when selected, indicates that the current image is to be printed, the computer responding to a touch input positioned in the sixth control area by causing the current image to be printed on a printer accessible to the computer.

* * * * *